US012568465B2

(12) United States Patent     (10) Patent No.:    US 12,568,465 B2

Murray et al.     (45) Date of Patent:    *Mar. 3, 2026

---

(54) PAGING FOR UNLICENSED NEW RADIO

(71) Applicant: InterDigital Patent Holdings, Inc., Wilmington, DE (US)

(72) Inventors: Joseph M. Murray, Schwenksville, PA (US); Pascal M. Adjakple, Great Neck, NY (US); Lakshmi R. Iyer, King of Prussia, PA (US); Qing Li, Princeton Junction, NJ (US); Mohamed Awadin, San Diego, CA (US); Yifan Li, Conshohocken, PA (US); Allan Y. Tsai, Boonton, NJ (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 183 days.

This patent is subject to a terminal disclaimer.

(21) Appl. No.: 18/616,849

(22) Filed: Mar. 26, 2024

(65)      Prior Publication Data

US 2024/0251383 A1     Jul. 25, 2024

Related U.S. Application Data

(63) Continuation of application No. 17/279,213, filed as application No. PCT/US2019/046485 on Aug. 14, 2019, now Pat. No. 11,968,644.

(Continued)

(51) Int. Cl.
   *H04W 68/02*      (2009.01)
   *H04W 24/08*      (2009.01)
     (Continued)

(52) U.S. Cl.
   CPC ......... *H04W 68/005* (2013.01); *H04W 24/08* (2013.01); *H04W 56/001* (2013.01); *H04W 72/23* (2023.01); *H04W 74/0816* (2013.01)

(58) Field of Classification Search
   CPC . H04W 68/005; H04W 24/08; H04W 56/001; H04W 72/23; H04W 74/0816; H04W 76/28; H04W 68/02
   See application file for complete search history.

(56)      References Cited

U.S. PATENT DOCUMENTS

2010/0279715 A1   11/2010   Alanara et al.
2016/0057738 A1   2/2016   Lee et al.
     (Continued)

FOREIGN PATENT DOCUMENTS

CN      107079499 A    8/2017
EP      3577935 A1    12/2019
     (Continued)

OTHER PUBLICATIONS

Third Generation Partnership Project (3GPP), "Overall description" Stage 2 (Release 15), 3GPP TS 36.300 V15.2.0, Jun. 2018, 357 pages.
     (Continued)

*Primary Examiner* — Said M Elnoubi
(74) *Attorney, Agent, or Firm* — Flaster Greenberg, P.C.

(57)      ABSTRACT

Methods and apparatus are disclosed pertaining to paging for Unlicensed New Radio (NR-U). Methods include means to: perform paging using multiple paging occasions (POs) during a DRX Cycle, perform paging using a paging window, perform paging using a PO comprised of multiple sweeps and/or repetitions, signal DL channel access indication for paging, and perform paging using dynamic DRX. In accordance with one embodiment, an apparatus may receive a signal comprising a plurality of POs, wherein each PO
     (Continued)

comprises a plurality of physical downlink control channel (PDCCH) monitoring occasions. The apparatus may monitor, based on receiving an identifier associated with the apparatus, a portion of the plurality of paging occasions. The apparatus may detect, in a PDCCH monitoring occasion of the plurality of PDCCH monitoring occasions in the monitored portion, paging downlink control information (DCI).

20 Claims, 26 Drawing Sheets

Related U.S. Application Data

(60) Provisional application No. 62/736,850, filed on Sep. 26, 2018.

(51) Int. Cl.
| | |
|---|---|
| *H04W 56/00* | (2009.01) |
| *H04W 68/00* | (2009.01) |
| *H04W 72/23* | (2023.01) |
| *H04W 74/0816* | (2024.01) |

(56) References Cited

U.S. PATENT DOCUMENTS

| | | | |
|---|---|---|---|
| 2017/0230933 A1 | 8/2017 | Radulescu et al. | |
| 2017/0280481 A1 | 9/2017 | Stem-Berkowitz et al. | |
| 2017/0367069 A1 | 12/2017 | Agiwal et al. | |
| 2018/0054780 A1 | 2/2018 | Radulescu et al. | |
| 2018/0199310 A1 | 7/2018 | Islam et al. | |
| 2018/0249440 A1 | 8/2018 | Zhang et al. | |
| 2019/0028999 A1 | 1/2019 | Yerramalli et al. | |
| 2020/0059852 A1 | 2/2020 | Urabayashi et al. | |
| 2021/0306986 A1* | 9/2021 | Takahashi | H04W 68/00 |
| 2021/0385800 A1 | 12/2021 | Harada et al. | |

FOREIGN PATENT DOCUMENTS

| | | | |
|---|---|---|---|
| JP | 2017530605 A | 10/2017 | |
| TW | 201729633 A | 8/2017 | |
| TW | 201831015 A | 8/2018 | |
| WO | WO 2017145120 A1 | 8/2017 | |
| WO | WO 2017/162813 A1 | 9/2017 | |
| WO | WO 2018045307 A1 | 3/2018 | |
| WO | WO 2018/070355 A1 | 4/2018 | |
| WO | WO 2018/144873 A1 | 8/2018 | |

OTHER PUBLICATIONS

Third Generation Partnership Project (3GPP), "Physical Channels and Modulation" (Release 15), 3GPP TS 36.211 V15.2.0, Jun. 2018, 236 pages.

Third Generation Partnership Project (3GPP), "Physical Layer Procedures for Control" (Release 15), 3GPP TS 38.213 V15.2.0, Jun. 2018, 99 pages.

Third Generation Partnership Project (3GPP), "System Architecture for the 5G System" (Release 15), 3GPP TS 23.501 V15.3.0, Sep. 2018, 226 pages.

Third Generation Partnership Project (3GPP), "Multiplexing and Channel Coding" (Release 15), 3GPP TS 38.212 V 15.2.0, Jun. 2018, 105 pages.

Third Generation Partnership Project (3GPP), "Physical Layer Procedures for Data" (Release 15), 3GPP TS 38.214 V15.2.0, Jun. 2018, 94 pages.

Third Generation Partnership Project (3GPP), "NR and NG-RAN Overall Description"; Stage 2 (Release 15), 3GPP TS 38.300 V 15.2.0, Jun. 2018, 87 pages.

Third Generation Partnership Project (3GPP), "Medium Access Control (MAC) Protocol Specification" (Release 15), 3GPP TS 38.321 V15.2.0, Jun. 2018, 73 pages.

Third Generation Partnership Project (3GPP), "User Equipment (UE) Procedures in Idle Mode and RRC Inactive State" (Release 15), 3GPP TS 38.304 V15.0.0, Jun. 2018, 25 pages.

Third Generation Partnership Project (3GPP), "System information Handling and Paging Operation in NR-U", Oppo, 3GPP TSG-RAN WG2 Meeting #103, Gothenberg, Sweden, Aug. 20, 2018-Aug. 24, 2018, R2-1811069, 3 pages.

Third Generation Partnership Project (3GPP), "Offline Summary for A1 7.1.1.1 on Paging", Huawei, HiSilicon, 3GPP TSG RAN WG 1 Meeting #94, Gothenburg, Sweden, Aug. 20-24, 2018, R1-1809925, 8 pages.

Third Generation Partnership Project (3GPP), "Paging Enhancements for NR-U", Vivo, 3GPP TSG-RAN WG2 Meeting # 103, Gothenburg, Sweden, Aug. 20-24, 2018, R2-1811792, 2 pages.

Third Generation Partnership Project (3GPP), "On Initial Access for NR Unlicensed Spectrum", InterDigital Inc., 3GPP TSG RAN WG 1 Meeting #93, Busan, South Korea, May 21-25, 2018, R1-1807037, 6 pages.

Third Generation Partnership Project (3GPP), "Discussion on Paging and SI for NR-U", Huawei, HiSilicon, 3GPP TSG-RAN WG2 Meeting #103, Gothenburg, Sweden, Aug. 20-24, 2018, R2-1812660, 3 pages.

* cited by examiner

1400

1500

102

115/116/117

122

PAGING FOR UNLICENSED NEW RADIO

CROSS-REFERENCE TO RELATED APPLICATIONS

This application is a continuation of U.S. Non-Provisional patent application Ser. No. 17/279,213, filed Mar. 24, 2021, which is the National Stage Application of International Patent Application No. PCT/US2019/046485, filed Aug. 14, 2019, which claims the benefit of U.S. Provisional Patent Application No. 62/736,850, filed Sep. 26, 2018, which is hereby incorporated by reference in its entirety.

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for paging for Unlicensed New Radio (NR-U). Methods include means to: perform paging using multiple paging occasions (POs) during a DRX Cycle, perform paging using a paging window, perform paging using a PO comprised of multiple sweeps and/or repetitions, signal DL channel access indication for paging, and perform paging using dynamic DRX. In accordance with one embodiment, an apparatus may receive a signal comprising a plurality of POs, wherein each PO comprises a plurality of physical downlink control channel (PDCCH) monitoring occasions. The apparatus may monitor, based on receiving an identifier associated with the apparatus, a portion of the plurality of paging occasions. The apparatus may detect, in a PDCCH monitoring occasion of the plurality of PDCCH monitoring occasions in the monitored portion, paging downlink control information (DCI).

BRIEF DESCRIPTION OF THE DRAWINGS

A more detailed understanding may be had from the following description, given by way of example in conjunction with accompanying drawings wherein.

DETAILED DESCRIPTION

Figure 1:
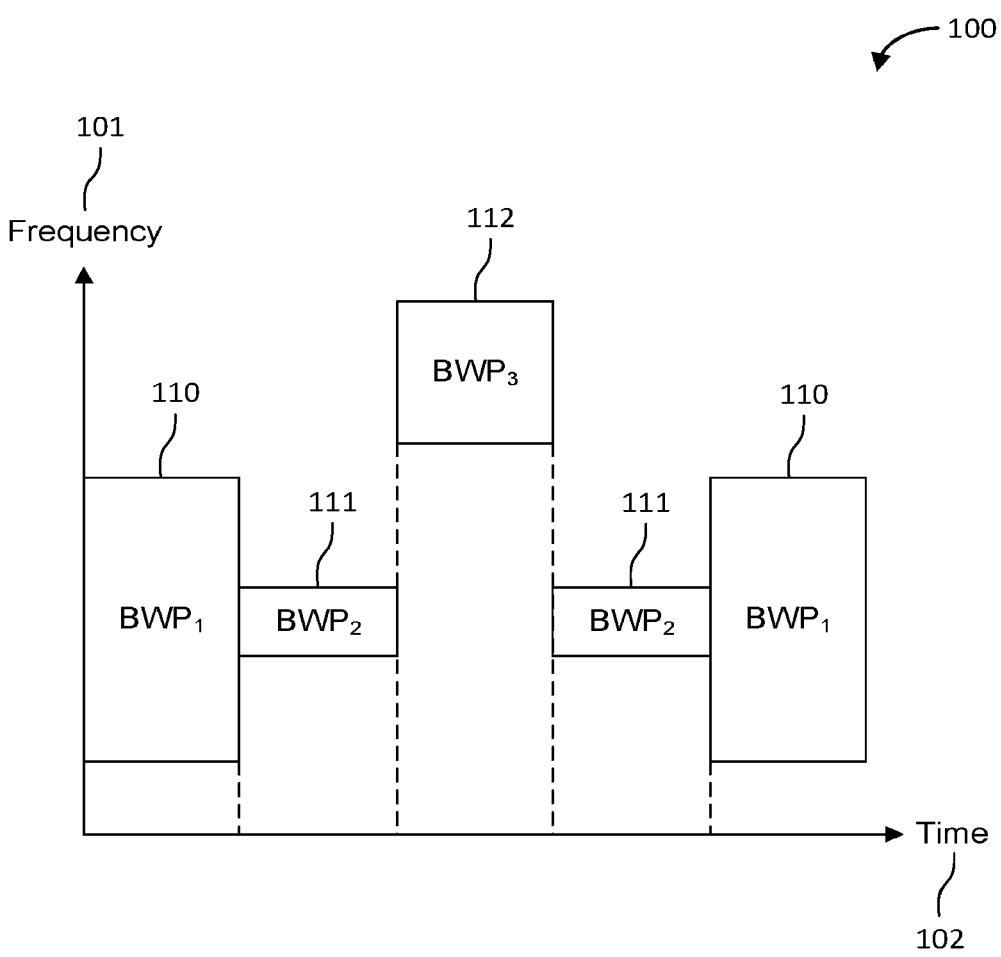
FIG. 1 is a diagram of a Bandwidth Adaption (BA) example.

Methods and apparatuses are described herein for paging for Unlicensed New Radio (NR-U). In accordance with the embodiments described herein, an apparatus may receive a signal comprising a plurality of POs, wherein each PO comprises a plurality of physical downlink control channel (PDCCH) monitoring occasions. The apparatus may monitor, based on receiving an identifier associated with the apparatus, a portion of the plurality of paging occasions. The apparatus may detect, in a PDCCH monitoring occasion of the plurality of PDCCH monitoring occasions in the monitored portion, paging downlink control information (DCI).

The following is a list of acronyms that may appear in the following description. Unless otherwise specified, the acronyms used herein refer to the corresponding terms listed below:

BA Bandwidth Adaption
BWP Bandwidth Part
CAI Channel Access Indication
CORESET Control Resource Set
DCI Downlink Control Information
DL Downlink
DRS Discovery Reference Signal
DRX Discontinuous Reception
DwPTS Downlink Pilot Timeslot
eNB Evolved Node B
gNB NR NodeB
IE Information Element
Li Layer 1
LAA License Assisted Access
LBT Listen-Before-Talk
LTE Long Term Evolution
MAC Medium Access Control
MT Mobile Terminated
NR New Radio
NR-U NR Unlicensed
OFDM Orthogonal Frequency Division Multiplexing
PDCCH Physical Downlink Control Channel
PF Paging Frame
PHY Physical Layer
PO Paging Occasion
P-RNTI Paging Radio Network Temporary Identifier
PSB Paging Subband
PWS Public Warning System
RAN Radio Access Network
RNTI Radio Network Temporary Identifier
RRC Radio Resource Control
RRM Radio Resource Management
SCell Secondary Cell
SI System Information
SpCell Special Cell
SS Synchronization Signal
SSB SS Block
TRP Transmission and Reception Point
UE User Equipment
UL Uplink Carrier aggregation with at least one SCell operating in the unlicensed spectrum may be referred to as Licensed-Assisted Access (LAA). In LAA, the configured set of serving cells for a UE therefore may include at least one SCell operating in the unlicensed spectrum according to frame structure Type 3, also may be called LAA SCell. Typically, LAA SCells may act as regular SCells.

LAA eNB and UE may apply Listen-Before-Talk (LBT) before performing a transmission on LAA SCell. When LBT is applied, the transmitter may listen to/sense the channel to determine whether the channel is free or busy. If the channel is determined to be free, the transmitter may perform the transmission; otherwise, it may not perform the transmission. If an LAA eNB uses channel access signals of other technologies, e.g., for the purpose of LAA channel access, it may continue to meet the LAA maximum energy detection threshold requirement.

LTE frame structure type 3 may be applicable to LAA secondary cell operation, typically, with normal cyclic prefix only. Each radio frame may be $T_f$=307200-$T_s$=10 ns long and may consist of 20 slots of length $t_{slot}$=15360-$T_s$=0.5 ns, numbered from 0 to 19. A subframe may be defined as two consecutive slots where subframe i may consist of slots i and 2i+1.

The 10 subframes within a radio frame may be available for downlink or uplink transmissions. Downlink transmissions may occupy one or more consecutive subframes, for example, starting anywhere within a subframe and ending with the last subframe either fully occupied or following one of the DwPTS. Uplink transmissions may occupy one or more consecutive subframes.

The UE may use discontinuous reception (DRX) in RRC_IDLE and RRC_INACTIVE state in order to reduce power consumption. The UE may monitor one paging occasion (PO) per DRX cycle. A PO may be a set of PDCCH monitoring occasions and may consist of multiple time slots (e.g., subframe or OFDM symbol) where paging Downlink Control Information (DCI) may be sent. One Paging Frame (PF) is one Radio Frame and may contain one or multiple PO(s) or starting point of a PO.

In multi-beam operations, the length of one PO may be one period of beam sweeping and the UE may assume that the same paging message is repeated in all beams of the sweeping pattern, and, thus, the selection of the beam(s) for the reception of the paging message may be up to UE implementation. The paging message may be same for both RAN initiated paging and CN initiated paging.

The UE may initiate RRC Connection Resume procedure upon receiving RAN paging. If the UE receives a CN initiated paging in RRC_INACTIVE state, the UE may move to RRC_IDLE and may inform NAS.

PF, PO may be determined by the following formulae. SFN for the PF may be determined by: (SFN+PF_offset) mod T=(T div N)*(UE_ID mod N).

Index (i_s), indicating the start of a set of PDCCH monitoring occasions for the paging DCI, may be determined by: i_s=floor (UE_ID/N) mod Ns.

The PDCCH monitoring occasions for paging may be determined according to paging-SearchSpace and firstPDCCH-MonitoringOccasionOfPO if configured. Otherwise, the PDCCH monitoring occasions for paging may be determined according to the default association (i.e., PDCCH monitoring occasions for paging may be same as for RMSI).

For a default association, Ns may be either 1 or 2. For Ns=1, there may be only one PO which starts in the PF. For Ns=2, PO may be either in the first half frame (i_s=0) or the second half frame (i_s=1) of the PF.

For a non-default association (i.e., when paging-SearchSpace is used), the UE may monitor the (i_s+1)$^{th}$ PO where the first PO may start in the PF. The PDCCH monitoring occasions for paging which are not overlapping with UL symbols may be sequentially numbered from zero, starting from the 1st PDCCH monitoring occasion for paging in the PF. When firstPDCCH-MonitoringOccasionOfPO is present, the (i_s+1)$^{th}$ PO may be a set of 'S' consecutive PDCCH monitoring occasions for paging starting from the PDCCH monitoring occasion indicated by firstPDCCH-MonitoringOccasionOfPO (i.e., the (i_s+1)$^{th}$ value of the firstPDCCH-MonitoringOccasionOfPO parameter). Otherwise, the (i_s+1)$^{th}$ PO may be a set of 'S' consecutive PDCCH monitoring occasions for paging, starting from the (i_s*S)$^{th}$ PDCCH monitoring occasion for paging where 'S' may be the number of actual transmitted SSBs determined according to ssb-PositionsInBurst in SystemInformation-Block1. The $K^{th}$ PDCCH monitoring occasion for paging in the PO may correspond to the $K^{th}$ transmitted SSB.

The following parameters may be used for the calculation of PF and i_s described above:

(1) T: DRX cycle of the UE (T may be determined by the shortest of the UE specific DRX value, if configured by RRC or upper layers, and a default DRX value broadcast in system information. If UE specific DRX is not configured by RRC or by upper layers, the default value may be applied);

(2) N: number of total paging frames in T;

(3) Ns: number of paging occasions for a PF;

(4) PF_offset: offset used for PF determination; and (5) UE_ID: 5G-S-TMSI mod 1024.

Parameters N, Ns, first-PDCCH-MonitoringOccasion-OfPO, PF_offset, and the length of default DRX Cycle may be signaled in SIB1. If the UE has no 5G-S-TMSI, for instance when the UE has not yet registered onto the network, the UE may use as a default: identity UE_ID=0 in the PF and i_s formulas above. 5G-S-TMSI may be a 48 bit long bit string. The 5G-S-TMSI in the formulae above may be interpreted as a binary number where the left most bit represents the most significant bit.

Table 1 below shows information that may be transmitted by means of the DCI format 1_0 with CRC scrambled by P-RNTI.

TABLE 1

| Paging DCI | | |
| --- | --- | --- |
| Field Name | # Bits | Comment |
| Short Messages Indicator | 2 | As defined in Table 2. |
| Short Messages | 8 | If only the scheduling information for Paging is carried, this bit field is reserved. |
| Frequency domain resource assignment | $\lceil \log_2(N_{RB}^{DL,BWP}(N_{RB}^{DL,BWP} + 1)/2) \rceil$ | If only the short message is carried, this bit field is reserved. |
| Time domain resource assignment | 4 | If only the short message is carried, this bit field is reserved. |
| VRB-to-PRB mapping | 1 | If only the short message is carried, this bit field is reserved. |
| Modulation and coding scheme | 5 | If only the short message is carried, this bit field is reserved. |
| TB scaling | 2 | If only the short message is carried, this bit field is reserved. |
| Reserved | 6 | |

Table 2 below shows information that may be transmitted by means of the DCI format 1_0 with CRC scrambled by P-RNTI.

TABLE 2

| Short Message Indicator | |
| --- | --- |
| Bit Field | Description |
| 00 | Reserved |
| 01 | Only scheduling information for Paging is present in the DCI |
| 10 | Only short message is present in the DCI |
| 11 | Both scheduling information for Paging and short message are present in the DCI |

With Bandwidth Adaptation (BA), the receive and transmit bandwidth of a UE, typically, need not be as large as the bandwidth of the cell and may be adjusted: the width may be ordered to change (e.g., to shrink during period of low activity to save power); the location may move in the frequency domain (e.g., to increase scheduling flexibility); and the subcarrier spacing may be ordered to change (e.g., to allow different services). A subset of the total cell bandwidth of a cell may be referred to as a Bandwidth Part (BWP) and BA may be achieved by configuring the UE with BWP(s) and telling the UE which of the configured BWPs is currently the active one.

FIG. 1 shows an example of BA 100. In the example of FIG. 1, three different BWPs are shown with respect to time 102 and frequency: $BWP_1$ 110, $BWP_2$ 111, and $BWP_3$ 112. The BWPs may be configured as follows: $BWP_1$ 110 may be with a width of 40 MHz and a subcarrier spacing of 15 kHz; $BWP_2$ 111 may be with a width of 10 MHz and a subcarrier spacing of 15 kHz; and $BWP_3$ 112 may be with a width of 20 MHz and a subcarrier spacing of 60 kHz.

A Serving Cell may be configured with at most four BWPs, and, typically, for an activated Serving Cell, there is one active BWP at any point in time. The BWP switching for a Serving Cell may be used to activate an inactive BWP and deactivate an active BWP at a time and may be controlled by the PDCCH indicating a downlink assignment or an uplink grant. Upon addition of SpCell (Special Cell) or activation of an SCell, one BWP may be initially active without receiving PDCCH indicating a downlink assignment or an uplink grant. The active BWP for a Serving Cell may be indicated by either RRC or PDCCH. For unpaired spectrum, a DL BWP may be paired with a UL BWP, and BWP switching may be common for both UL and DL.

The embodiments described herein address several issues in conventional paging procedures. For NR, the UE monitors one PO per DRX cycle, where a PO may be a set of PDCCH monitoring occasions, each corresponding to a fixed time instance (e.g. one or more OFDM symbols) within a Paging Frame (PF), where paging DCI may be sent. For NR-U, the gNB may need to perform LBT before performing DL transmissions, which may prevent the gNB from transmitting the paging DCI during the PO. This may result in the gNB having to wait a full DRX cycle before attempting to page the UE again, which may not be acceptable in some scenarios, e.g., when paging a UE to establish a Mobile Terminated (MT) call for a low system access latency service or when sending a Public Warning System (PWS) indication. Furthermore, NR has introduced the RRC_INACTIVE state which is, for example, intended to allow a UE to transition very quickly and efficiently from a low power state to a fully connected state. For NR-U, the benefits of this state may be lost if the paging procedure is severely impacted by LBT. Therefore, there is a need to enhance the NR-U paging procedure to ensure that a UE may be paged reliably and without incurring excessive latency.

Aspects disclosed herein include the following solutions to the issues described above:

(1) Methods to Perform Paging Using Multiple POs During a DRX Cycle such as for example:

A method for a UE to monitor multiple POs during a DRX cycle, where the POs to monitor may be multiplexed in the time and/or frequency domains;

A method for a UE to select the POs to monitor during a DRX cycle from 1 or more Paging-SearchSpace fields;

A method for a UE to select the POs to monitor during a DRX cycle from 1 or more groups of PDCCH monitoring occasions;

A method for a UE to select the POs to monitor during a DRX cycle from POs associated with multiple PFs;

A method for a UE to determine the next PO to monitor in a DRX cycle that is based on a set of configured rules;

A method for a UE to monitor POs configured for multiple BWPs/subbands; and

A method for a UE to determine when subsequent POs configured in a DRX cycle should be monitored.

(2) Methods to Perform Paging Using a Paging Window such as for example:

A method to define a flexible starting point for a PO.

(3) Methods to Perform Paging Using a PO Comprised of Multiple Sweeps/Repetitions such as for example:

A PO definition, where the PO is defined as a set of consecutive PDCCH monitoring occasions that may be used for transmission of the paging DCI using multiple sweeps and/or repetitions.

(4) Methods to Signal DL Channel Access Indication for Paging such as for example:

A method to signal the DL Channel Access Indication via the paging DCI.

(5) Methods to Perform Paging Using Dynamic DRX such as for example:

A method to dynamically adapt the DRX cycle when the UE detects that the gNB was/wasn't able to acquire the channel during a PO.

Figure 2:
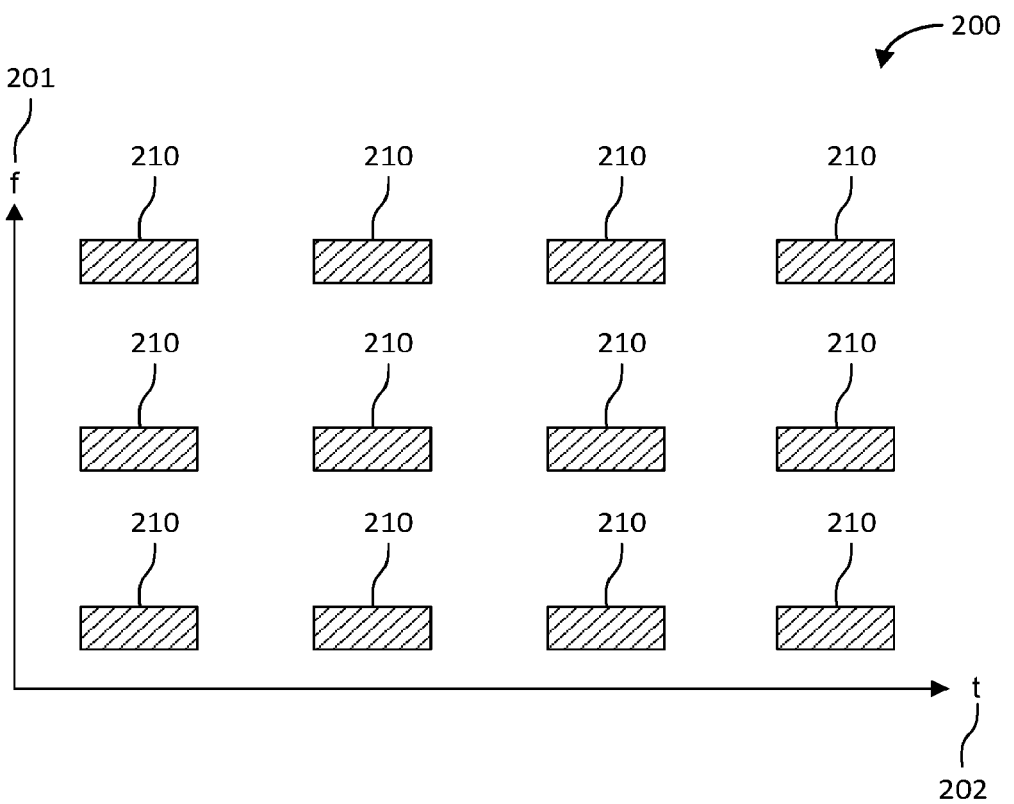
FIG. 2 is a diagram of an example multiplexing of Paging Occasions (POs) in time and frequency domains.

FIG. 2 is an example 200 of multiplexing of POs in the time and the frequency domains in accordance with one embodiment, which may be used in combination with any of the embodiments described herein. FIG. 2 shows a plurality of POs 210 multiplexed in the time domain 202 and frequency domain 201. As shown in the example of FIG. 2, to improve the robustness of the paging procedure, the UE may monitor one or more of the POs 210 during a DRX cycle, where the one or more POs 210 to be monitored may be multiplexed in the time domain 202 and/or frequency domain 201. The number of POs 210 to be monitored during the DRX cycle may be preconfigured or may be configured by higher layers using broadcast or dedicated signaling, and may depend on, for example, the service type, system access latency requirements, power consumption requirements.

For example, the PCCH-Config field included in the DownlinkConfigCommonSIB IE may be used to signal a parameter; e.g. Nm, that is used to configure the number of POs to be monitored during a DRX cycle. For illustrative purposes, the scenario where the parameter Nm may be set to a value equal to 1, 2, 4 or 8 is considered herein. The parameter may be signaled using a PCCH-Config field defined as shown below. In this example, when the parameter Nm is not explicitly signaled, a default value of 1 may be assumed. Extensions to other parameters signaled via the IE; e.g. support for additional SCS's, Ns values, N values, PF offset values, etc., may be conducted in the similar way as illustrated below.

```
PCCH-Config ::= SEQUENCE {
    defaultPagingCycle        PagingCycle,
    nAndPagingFrameOffset          CHOICE {
        oneT        NULL,
        halfT       INTEGER (0..1),
        quarterT          INTEGER (0..3),
        oneEighthT        INTEGER (0..7),
        oneSixteenthT     INTEGER (0..15)
    },
    Ns      ENUMERATED {four, two, one},
    firstPDCCH-MonitoringOccasionOfPO          CHOICE {
        sCS15KHZoneT
            SEQUENCE (SIZE (1..maxPO-perPF)) OF INTEGER (0..139),
        sCS30KHZoneT-SCS15KHZhalfT
            SEQUENCE (SIZE (1..maxPO-perPF)) OF INTEGER (0..279),
        sCS60KHZoneT-SCS30KHZhalfT-SCS15KHZquarterT
            SEQUENCE (SIZE (1..maxPO-perPF)) OF INTEGER (0..559),
        sCS120KHZoneT-SCS6OKHZhalfT-SCS30KHZquarterT-
SCS15KHZoneEighthT
            SEQUENCE (SIZE (1..maxPO-perPF)) OF INTEGER (0..1119),
        sCS120KHZhalfT-SCS60KHZquarterT-SCS30KHZoneEighthT-
SCS15KHZoneSixteenthT
            SEQUENCE (SIZE (1..maxPO-perPF)) OF INTEGER (0..2239),
        sCS120KHZquarterT-SCS60KHZoneEighthT-SCS30KHZoneSixteenthT
            SEQUENCE (SIZE (1..maxPO-perPF)) OF INTEGER (0..4479),
        sCS120KHZoneEighthT-SCS60KHZoneSixteenthT
            SEQUENCE (SIZE (1..maxPO-perPF)) OF INTEGER (0..8959),
        sCS120KHZoneSixteenthT
            SEQUENCE (SIZE (1..maxPO-perPF)) OF INTEGER (0..17919)
```

-continued

```
} OPTIONAL,      -   -- Need R
   ...,
        Nm   ENUMERATED {2, 4, 8}   OPTIONAL   --NEED S
}
```

Figure 3:
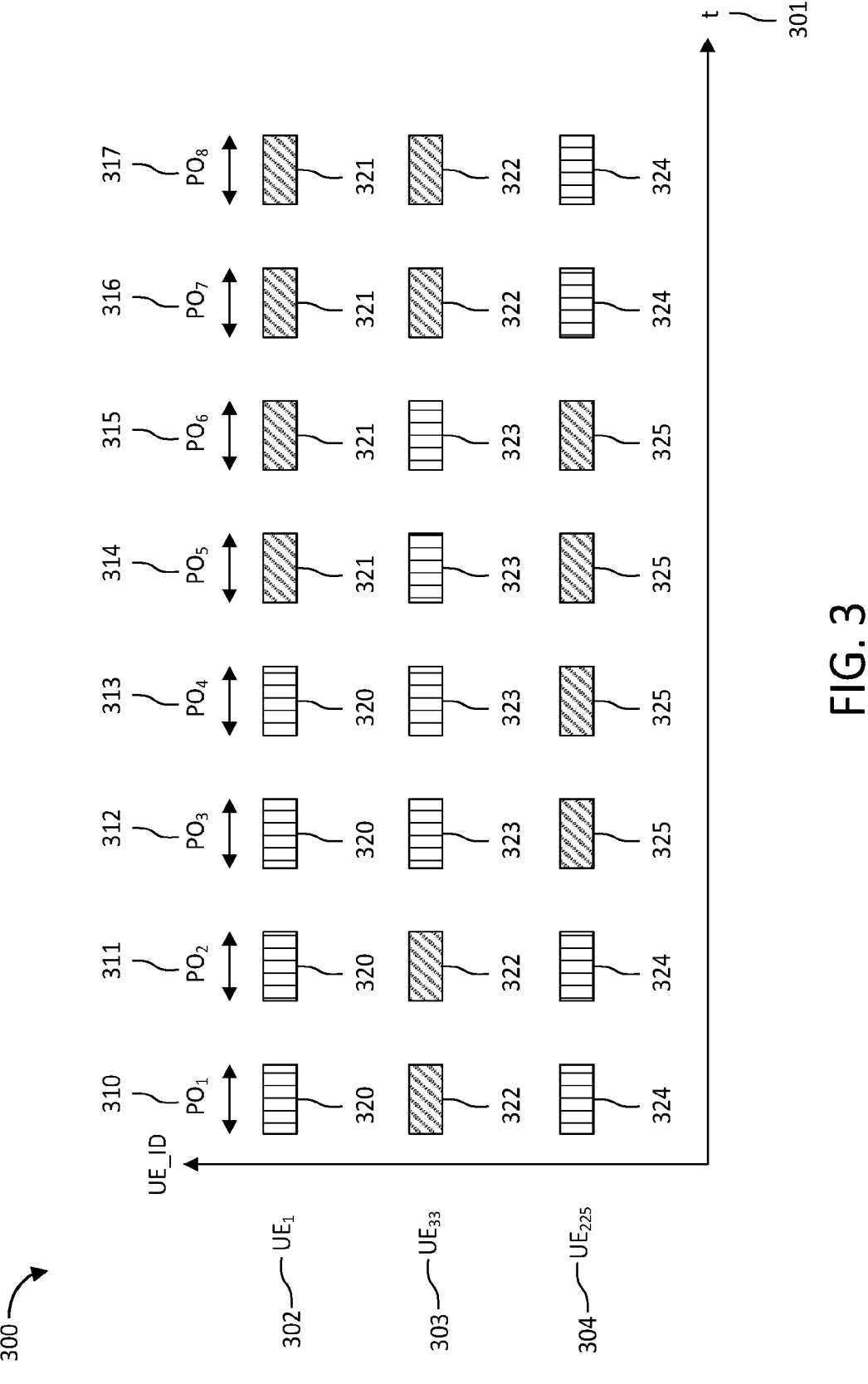
FIG. 3 is a diagram of an example time division multiplexing of consecutive POs.

FIG. 3 is an example 300 of monitoring multiple consecutive POs multiplexed in the time domain in accordance with one embodiment, which may be used in combination with any of the embodiments described herein. In the example of FIG. 3, a UE may be configured to monitor multiple POs during a DRX cycle, e.g., Nm, where the monitored POs may correspond to a set of POs that are multiplexed in the time domain. The POs to be monitored may be associated with the PF with an SFN determined by the formula: (SFN+PF_offset) mod T=(T div N)*(UE_ID mod N). For example, the monitored POs may correspond to a set of consecutive POs that may be multiplexed in the time domain, where the UEs are distributed to different sets of consecutive POs based on the UE_ID. In an aspect, the index $i\_s_m$ may indicate the start of a set of PDCCH monitoring occasions for the paging DCI for the $m^{th}$ monitored PO, where $1{\le}m{\le}Ns$, may be determined by the formula: $i\_s_m=$ (floor (UE_ID/N)+(m−1)) mod Ns.

Table 3 below shows the results of the calculations for 3 different UEs, shown in FIG. 3 UE1 302, UE33 303, and UE225 304, for the scenario where T=32, N=16, Ns=8 and Nm=4.

TABLE 3

| $i\_s_m$ Calculation for an aspect with Consecutive POs where T = 32, N = 16, Ns = 8 and Nm = 24 | | | | |
|---|---|---|---|---|
| UE_ID | $i\_s_1$ | $i\_s_2$ | $i\_s_3$ | $i\_s_4$ |
| 1 | 0 | 1 | 2 | 3 |
| 33 | 2 | 3 | 4 | 5 |
| 225 | 6 | 7 | 0 | 1 |

Referring to FIG. 3, a plurality of POs 310, 311, 312, 313, 314, 315, 316, and 317 in the time domain 301 are shown. UE1 302 may monitor POs 320 during POs 310, 311, 312, 313 and does not monitor POs 321 during POs 314, 315, 316, and 317. UE33 303 may monitor POs 323 during POs 312, 313, 314, and 315 and does not monitor POs 322 during POs 310, 311, 316, and 317. UE225 304 may monitor POs 324 during POs 310, 311, 316, and 317 and does not monitor POs 325 during POs 312, 313, 314, and 315.

Figure 4:
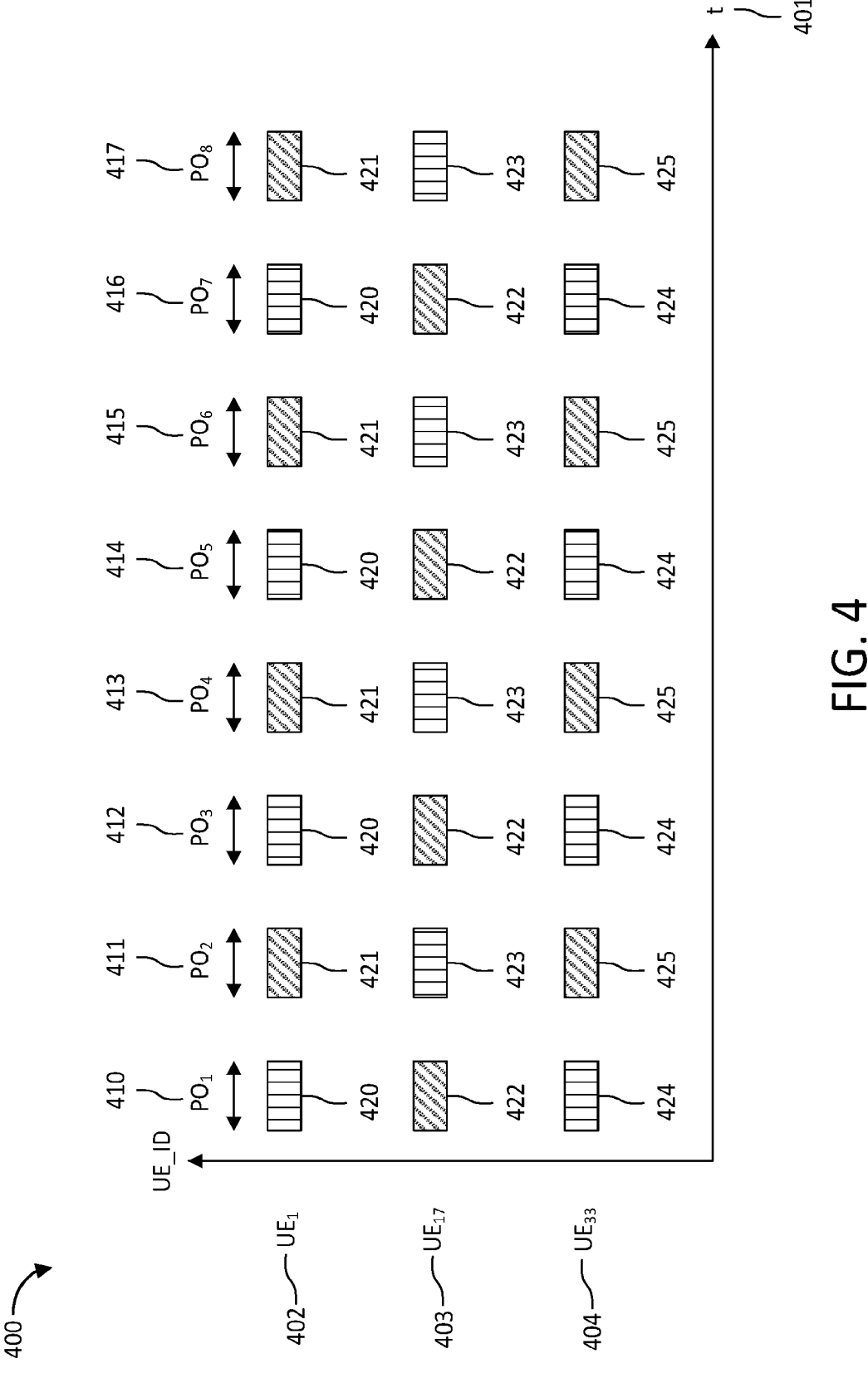
FIG. 4 is a diagram of an example time division multiplexing of non-consecutive POs.

FIG. 4 is an example 400 of monitoring multiple nonconsecutive POs multiplexed in the time domain in accordance with one embodiment, which may be used in combination with any of the embodiments described herein. The channel access probability for POs that are multiplexed in the time domain may be highly correlated, especially if the POs occur close to one another in time. To address this issue, as shown the example of FIG. 4, the UE may be configured to monitor a set of non-consecutive POs that are multiplexed in the time domain, where the UEs may be distributed to different sets of non-consecutive POs based on the UE_ID. In an aspect, the index $i\_s_m$ may indicate the start of a set of PDCCH monitoring occasions for the paging DCI for the $m^{th}$ monitored PO, where $1{\le}m{\le}Ns$, may be determined by the formula: $i\_s_m=$(floor (UE_ID/N)+(Ns div Nm)*(m−1)) mod Ns.

Table 4 shows the results of the calculations for 3 different UEs, shown in FIG. 4 UE1 402, UE17 403, and UE33 404, for the scenario where T=32, N=16, Ns=8 and Nm=4.

TABLE 4

| $i\_s_m$ Calculation for Embodiment with Consecutive POs where T = 32, N =16, Ns = 8 and Nm = 4 | | | | |
|---|---|---|---|---|
| UE_ID | $i\_s_1$ | $i\_s_2$ | $i\_s_3$ | $i\_s_4$ |
| 1 | 0 | 2 | 4 | 6 |
| 17 | 1 | 3 | 5 | 7 |
| 33 | 2 | 4 | 6 | 0 |

Referring to FIG. 4, a plurality of POs 410, 411, 412, 413, 414, 415, 416, and 417 in the time domain 401 are shown. UE1 402 may monitor POs 420 during POs 410, 412, 414, and 416 and does not monitor POs 421 during POs 411, 413, 415, and 417. UE17 403 may monitor POs 423 during POs 411, 413, 415, and 417 and does not monitor POs 422 during POs 410, 412, 414, and 416. UE33 404 may monitor POs 424 during POs 410, 412, 414, and 416 and does not monitor POs 425 during POs 411, 413, 415, and 417.

Figure 5:
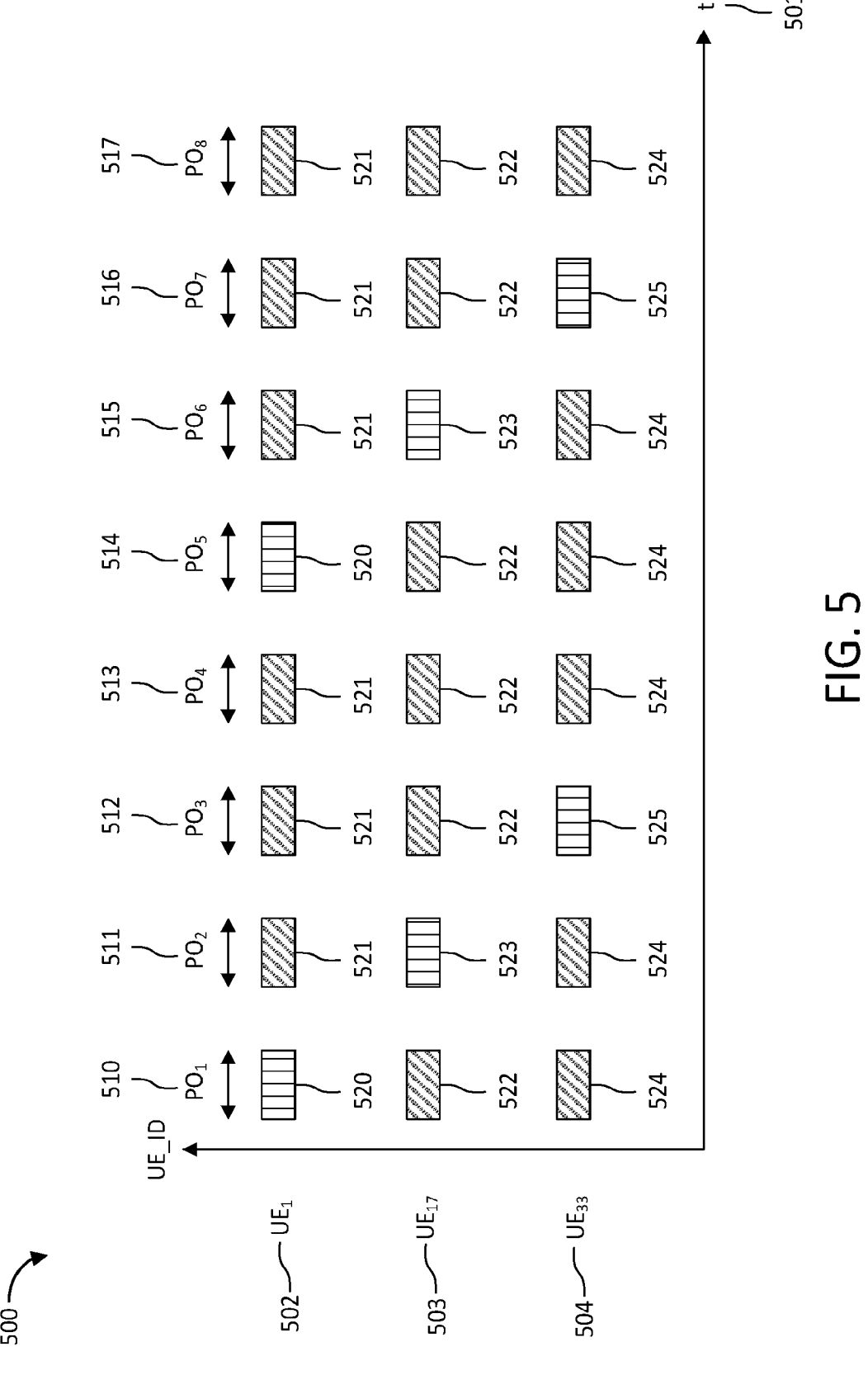
FIG. 5 is a diagram of an example time division multiplexing of non-consecutive POs.

FIG. 5 is another example 500 of monitoring multiple non-consecutive POs multiplexed in the time domain in accordance with one embodiment, which may be used in combination with any of the embodiments described herein.

Table 5 shows the results of the calculations for 3 different UEs, shown in FIG. 5 UE1 502, UE17 503, and UE33 504, for the scenario where T=32, N=16, Ns=8 and Nm=2.

TABLE 5

| $i\_s_m$ Calculation for Embodiment with Non-Consecutive POs where T =32, N = 16, Ns = 8 and Nm = 2 | | |
|---|---|---|
| UE_ID | $i\_s_1$ | $i\_s_2$ |
| 1 | 0 | 4 |
| 17 | 1 | 5 |
| 33 | 2 | 6 |

Referring to FIG. 5, a plurality of POs 510, 511, 512, 513, 514, 515, 516, and 517 in the time domain 501 are shown. UE1 502 may monitor POs 520 during POs 510 and 514 and does not monitor POs 521 during POs 511, 512, 513, 515, 516, and 517. UE17 503 may monitor POs 523 during POs 511 and 515 and does not monitor POs 522 during POs 510, 512, 513, 514, 516, and 517. UE33 504 may monitor POs 525 during POs 512 and 516 and does not monitor POs 524 during POs 510, 511, 513, 514, 515, and 517.

Figure 6:
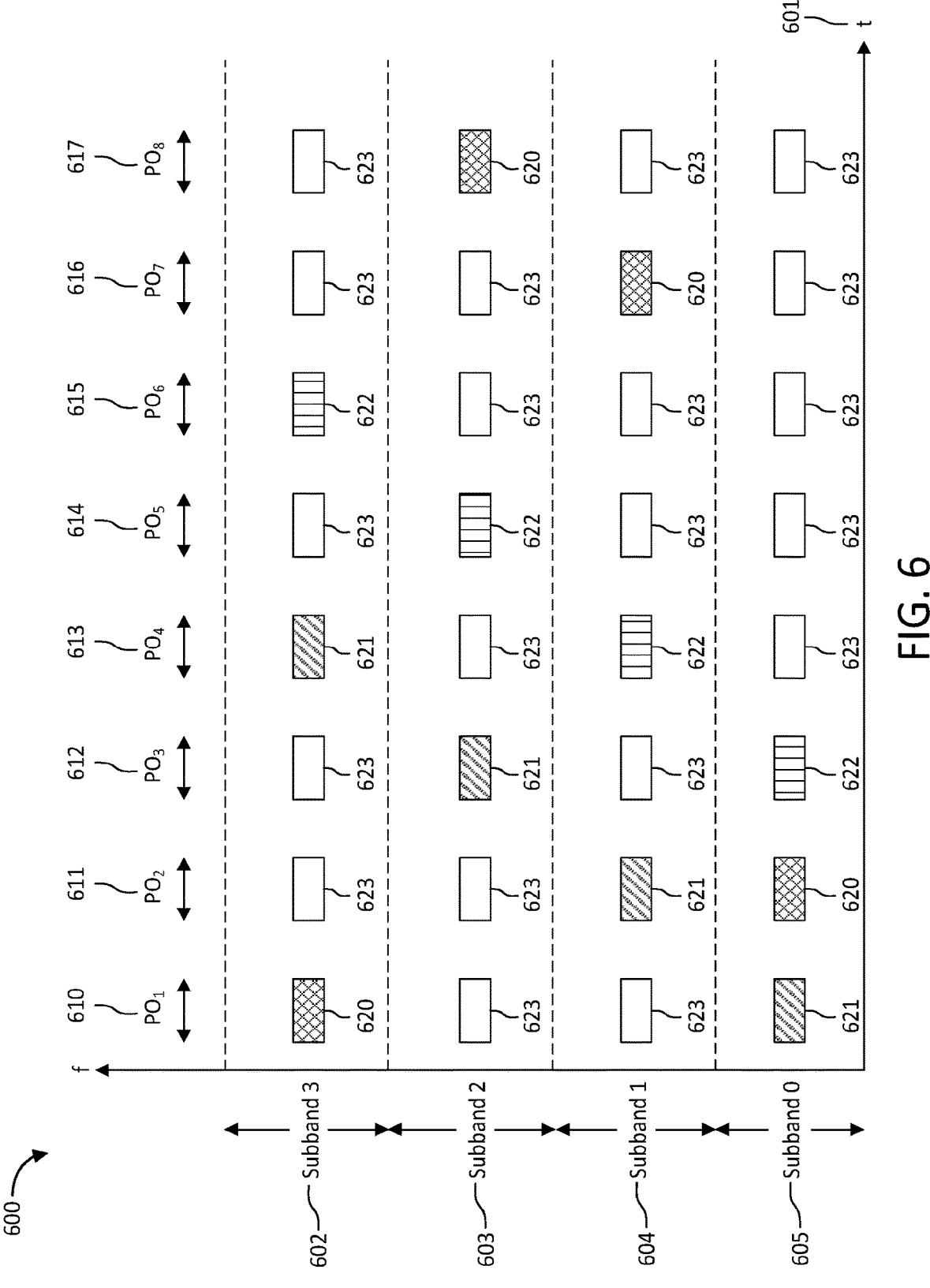
FIG. 6 is a diagram of an example time and frequency division multiplexing of consecutive POs.

FIG. 6 is another example 600 of monitoring POs multiplexed in the time and frequency domain in accordance with one embodiment, which may be used in combination with any of the embodiments described herein. For wideband carriers, the DL channel may be partitioned into subbands, where LBT may be performed on each subband independently. A Paging Subband (PSB) may be defined as a subband on which a UE may monitor the PDCCH for paging. In the example of FIG. 6, a UE may be configured to monitor the PDCCH for paging on one or more PSBs during a DRX cycle, where the UEs may be distributed to a different PSBs based on the UE_ID. The UE may monitor for paging on a different PSB during each monitored PO of a DRX cycle, where the PSB monitored for paging by the UE during the $m^{th}$ monitored PO may be determined by the formula: $PSB_m=(floor(UE\_ID/(N*Ns))+(m-1))$ mod $N_{PSB}$.

Table 6 shows the results of the calculations for 3 different UEs, UE1, UE33 and UE225, for the scenario where the UEs monitor consecutive POs and T=32, N=16, Ns=8, Nm=4 and Npsb=4.

TABLE 6

PSB$_m$ Calculation for Embodiment with Consecutive POs
where T = 32, N = 16, Ns = 8 and Nm = 4

| UE_ID | PSB$_1$ | PSB$_2$ | PSB$_3$ | PSB$_4$ |
|---|---|---|---|---|
| 1 | 0 | 1 | 2 | 3 |
| 33 | 0 | 1 | 2 | 3 |
| 225 | 1 | 2 | 3 | 0 |

Referring to FIG. 6, a plurality of POs 610, 611, 612, 613, 614, 615, 616, and 617 in the time domain 601 and a plurality of subbands: subband 3 602, subband 2 603, subband 1 604, and subband 0 605 are shown. UE1 may monitor POs 621. UE33 may monitor POs 622. UE225 may monitor POs 620. The UEs do not monitor POs 623.

Figure 7:
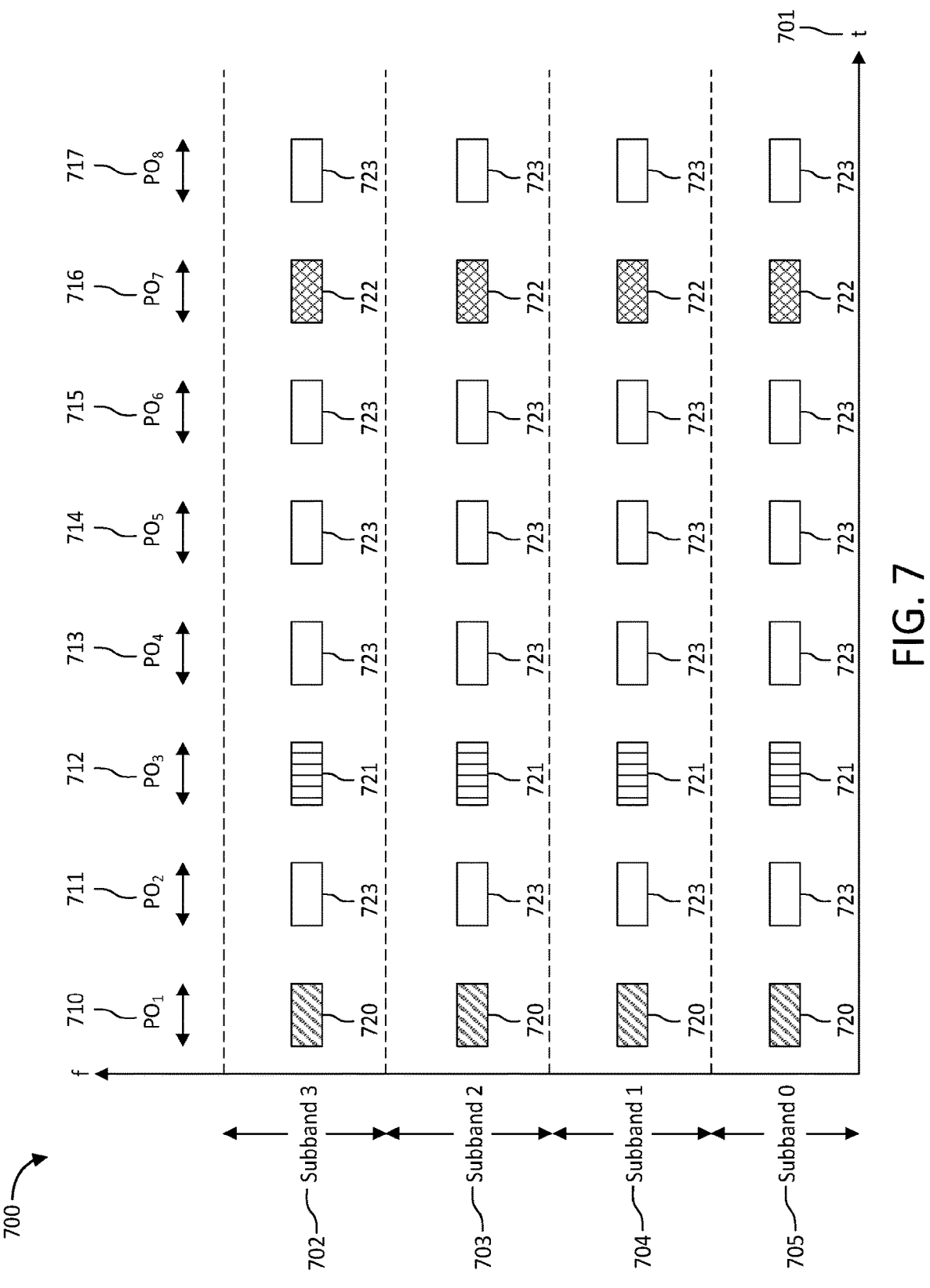
FIG. 7 is a diagram of an example frequency division multiplexing of monitored POs.

FIG. 7 is an example 700 of monitoring POs multiplexed in the frequency domain only in accordance with one embodiment, which may be used in combination with any of the embodiments described herein. In the example of FIG. 7, the UE may monitor POs multiplexed in just the frequency during a DRX cycle. Referring to FIG. 7, the POs are multiplexed in frequency where T=32, N=16, Ns=8, Nm=4 and Npsb=4. FIG. 7 shows a plurality of POs 710, 711, 712, 713, 714, 715, 716, and 717 in the time domain 701 and a plurality of subbands: subband 3 702, subband 2 703, subband 1 704, and subband 0 705. UE1 may monitor POs 720. UE33 may monitor POs 721. UE225 may monitor POs 722. The UEs do not monitor POs 723.

The following is an example of an PCCH-Config Information Element (IE) that may be used to signal the parameters described herein:

```
PCCH-Config ::=              SEQUENCE {
    defaultPagingCycle          PagingCycle,
    nAndPagingFrameOffset       CHOICE {
        oneT                        NULL,
        halfT                       INTEGER (0..1),
        quarterT                    INTEGER (0..3),
        oneEighthT                  INTEGER (0..7),
        oneSixteenthT               INTEGER (0..15)
    },
    ns                          ENUMERATED {eight, four, two, one},
    nm                          ENUMERATED {eight, four, two, one}
OPTIONAL,
    npsb                        ENUMERATED {eight, four, two, one}
OPTIONAL,
    firstPDCCH-MonitoringOccasionOfPO CHOICE {
        sCS15KHZoneT
    SEQUENCE (SIZE (1..4)) OF INTEGER (0..139),
        sCS30KHZoneT-SCS15KHZhalfT
    SEQUENCE (SIZE (1..4)) OF INTEGER (0..279),
        sCS60KHZoneT-SCS30KHZhalfT-SCS15KHZquarterT
        SEQUENCE (SIZE (1..4)) OF INTEGER (0..559),
        sCS120KHZoneT-SCS60KHZhalfT-SCS30KHZquarterT-SCS15KHZoneEighthT
            SEQUENCE (SIZE (1..4)) OF INTEGER (0..1119),
        sCS120KHZhalfT-SCS60KHZquarterT-SCS30KHZoneEighthT-
SCS15KHZoneSixteenthT SEQUENCE (SIZE (1..4)) OF INTEGER (0..2239),
        sCS120KHZquarterT-SCS60KHZoneEighthT-SCS30KHZoneSixteenthT
        SEQUENCE (SIZE (1..4)) OF INTEGER (0..4479),
        sCS120KHZoneEighthT-SCS60KHZoneSixteenthT
    SEQUENCE (SIZE (1..4)) OF INTEGER (0..8959),
        sCS120KHZoneSixteenthT
    SEQUENCE (SIZE (1..4)) OF INTEGER (0..17919)
    }   OPTIONAL,        -- Need R
    ...
}
```

TABLE 7

| PCCH-Config field descriptions |
| --- |
| PCCH-Config field descriptions | defaultPagingCycle

Default paging cycle, used to derive 'T' in TS 38.304. Value rf32
corresponds to 32 radio frames, rf64 corresponds to 64 radio frames and
so on.
nAndPagingFrameOffset Used to derive the number of total paging frames in T (corresponding to
parameter N in TS 38.304) and paging frame offset (corresponding to
parameter PF_offset in TS 38.304)
ns Number of paging occasions in paging frame
nm Number of paging occasions to monitor in paging frame
npsb Number of paging subbands to monitor in a paging frame
firstPDCCH-MonitoringOccasionOfPO Points out the first PDCCH monitoring occasion of each PO in the PF per
TS 38.304.

The Paging-SearchSpace field signaled via the PDCCH-ConfigCommon IE may be used for the configuration of the non-default association of POs and SSBs. For NR-U, a plurality of Paging-SearchSpace fields may be used to configure the set of POs that a UE shall monitor during a DRX cycle. The POs to monitor may be associated with the PF with an SFN that may be determined by the formula: $(SFN+PF\_offset) \bmod T = (T \div N)*(UE\_ID \bmod N)$. Index $(i\_s)$, indicating the start of a set of PDCCH monitoring occasions for the paging DCI, may be determined by: $i\_s = floor\ (UE\_ID/N) \bmod Ns$.

The set of POs to monitor during a DRX cycle may be comprised of the $(i\_s+1)^{th}$ PO in each of the Nm configured Paging-SearchSpaces. The POs in each paging search space may be organized as shown in the examples of FIG. 8 and FIG. 9, thereby allowing the POs monitored by a given UE during a DRX cycle to group together in time or disperse in time.

Figure 8:
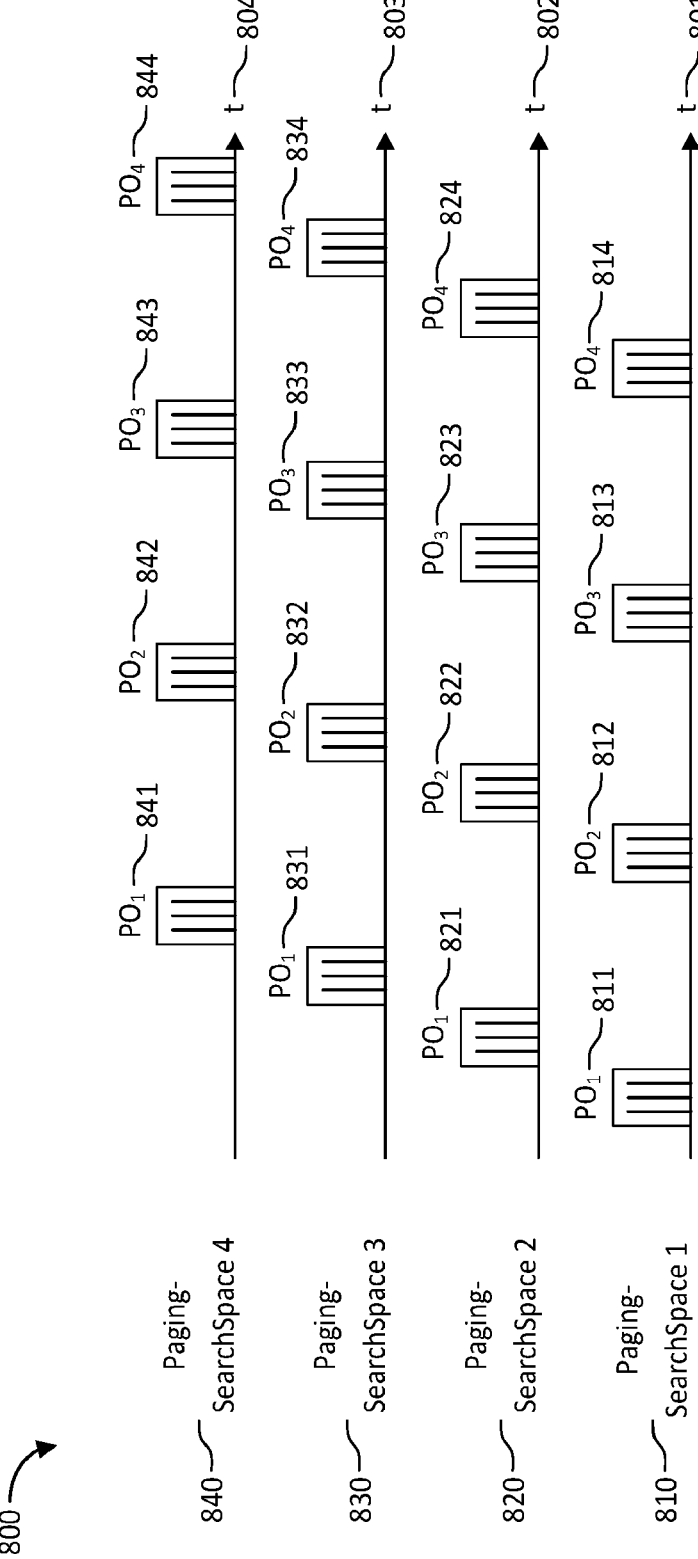
FIG. 8 is an exemplary configuration with non-contiguous POs in a paging search space.

FIG. 8 is an example 800 of an exemplary configuration with non-contiguous POs in a paging search space in accordance with one embodiment, which may be used in combination with any of the embodiments described herein. Each paging search space in this example comprises a plurality of non-contiguous POs that each comprise one of more PDCCH monitoring occasions. The example of FIG. 8 shows paging-searchspace4 840 and PG$_1$ 841, PG$_2$ 842, PG$_3$ 843, and PG$_4$ 844 with respect to the time domain 804. FIG. 8 also shows paging-searchspace 3 830 and PO$_1$ 831, PO$_2$ 832, PO$_3$ 833, and PO$_4$ 834 with respect to the time domain 803. FIG. 8 also shows paging-searchspace 2 820 and PO$_1$ 821, PO$_2$ 822, PO$_3$ 823, and PO$_4$ 824 with respect to the time domain 802. FIG. 8 also shows paging-searchspace 1 810 and PO$_1$ 811, PO$_2$ 812, PO$_3$ 813, and PO$_4$ 814 with respect to the time domain 801.

Figure 9:
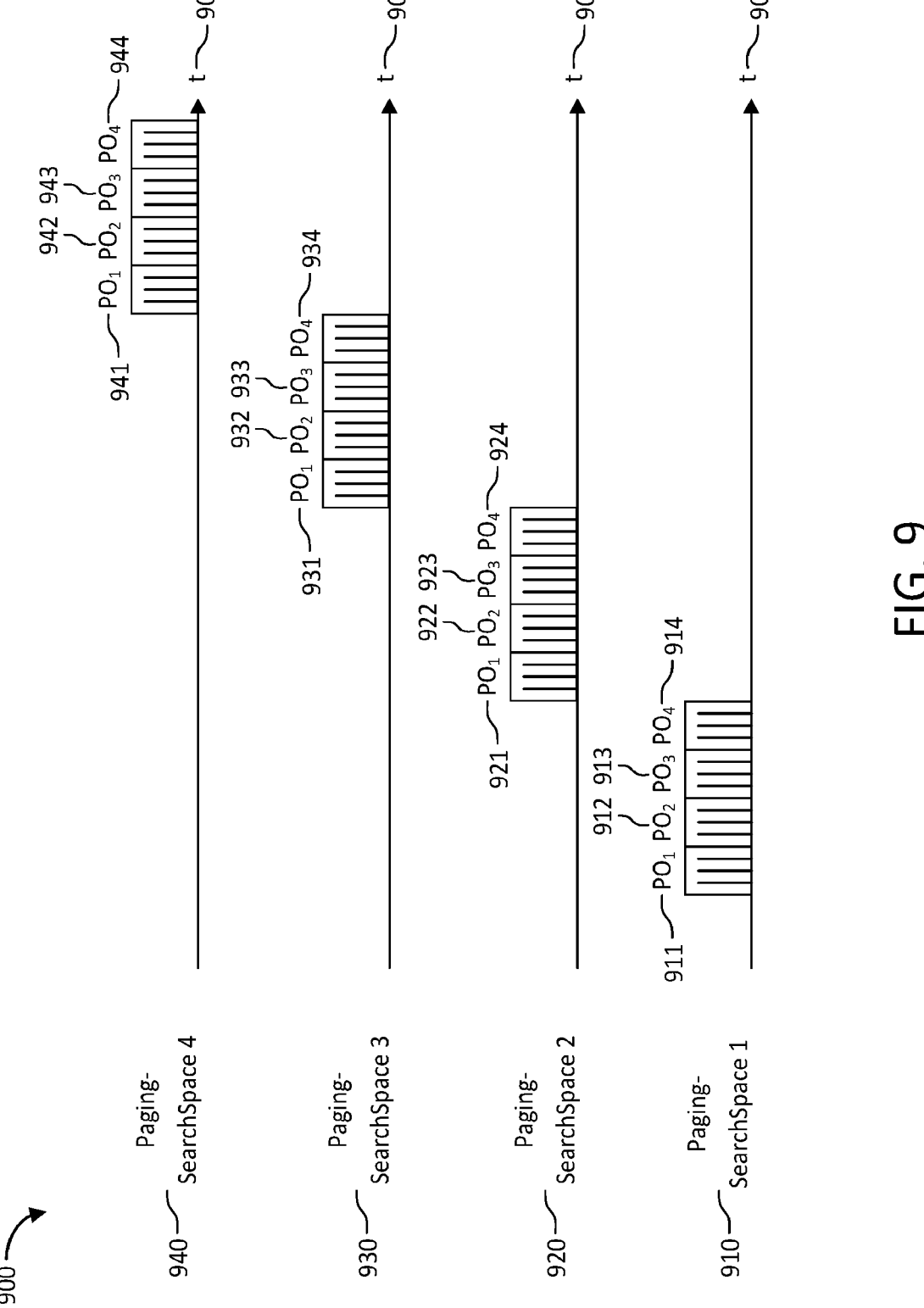
FIG. 9 is an exemplary configuration with contiguous POs in a paging search space.

FIG. 9 is an example 900 of an exemplary configuration with contiguous POs in a paging-searchspace in accordance with one embodiment, which may be used in combination with any of the embodiments described herein. Each paging-searchspace in this example comprises a plurality of contiguous POs that each comprise one of more PDCCH monitoring occasions. The example of FIG. 9 shows paging-searchspace 4 940 and PO$_1$ 941, PO$_2$ 942, PO$_3$ 943, and PO$_4$ 944 with respect to the time domain 904. FIG. 9 also shows paging-searchspace 3 930 and PO$_1$ 931, PO$_2$ 932, PO$_3$ 933, and PO$_4$ 934 with respect to the time domain 903. FIG. 9 also shows paging-searchspace 2 920 and PO$_1$ 921, PO$_2$ 922, PO$_3$ 923, and PO$_4$ 924 with respect to the time domain 902. FIG. 9 also shows paging-searchspace 1 910 and PO$_1$ 911, PO$_2$ 912, PO$_3$ 913, and PO$_4$ 914 with respect to the time domain 901.

The following is an example of the PDCCH-ConfigCommon IE that may be used to configure the multiple paging search spaces described above:

```
PDCCH-ConfigCommon ::=              SEQUENCE {
    controlResourceSetZero          INTEGER (0..15)           OPTIONAL, -- Cond
InitialBWP-Only
    commonControlResourceSet        ControlResourceSet        OPTIONAL, -- Need R
    searchSpaceZero                 INTEGER (0..15)           OPTIONAL, -- Cond
InitialBWP-Only
    commonSearchSpace               SEQUENCE (SIZE(1..4)) OF SearchSpace
OPTIONAL,-- Need R
    searchSpaceSIB1                 SearchSpaceId                        OPTIONAL,--
Need R
    searchSpaceOtherSystemInformation SearchSpaceId                      OPTIONAL,-
- Need R
    pagingSearchSpace               SEQUENCE (SIZE(1..4)) OF SearchSpaceId
OPTIONAL,-- Need R
    ra-SearchSpace                  SearchSpaceId                        OPTIONAL,-
- Need R
    ...
}
```

TABLE 8

| PDCCH-ConfigCommon field descriptions |
| --- |
| PDCCH-ConfigCommon field descriptions | commonControlResourceSet

An additional common control resource set which may be configured and used for RAR. If the network configures this field, it uses a ControlResourceSetId other than 0 for this ControlResourceSet.
commonSearchSpace An additional common search space.
controlResourceSetZero Parameters of the common CORESET#0. The values are interpreted like the corresponding bits in MIB pdcch-ConfigSIB1. Even though this field is only configured in the initial BWP (BWP#0) the UE acquires the CORESET#0 irrespective of the currently active BWP.
pagingSearchSpace ID of the Search space for paging. Corresponds to L1 parameter 'paging-SearchSpace'. If the field is absent, the monitoring occasions may be derived per TS 38.213.
ra-SearchSpace ID of the Search space for random access procedure. Corresponds to L1 parameter 'ra-SearchSpace'. If the field is absent, the monitoring occasions may be derived per TS 38.213.
searchSpaceOtherSystemInformation ID of the Search space for other system information, i.e., SIB2 and beyond. Corresponds to L1 parameter 'osi-SearchSpace'. If the field is absent, the monitoring occasions may be derived per TS 38.213.
searchSpaceSIB1

ID of the search space for SIB1 message.
Corresponds to L1 parameter 'rmsi-SearchSpace'.
searchSpaceZero Parameters of the common SearchSpace#0. The values are interpreted like the corresponding bits in MIB pdcch-ConfigSIB1. Even though this field is only configured in the initial BWP (BWP#0) the UE acquires the SearchSpace#0 irrespective of the currently active BWP.

| Conditional Presence | Explanation |
| --- | --- |
| InitialBWP-Only | The field is mandatory present in the PDCCH-ConfigCommon of the initial BWP (BWP#0). It is absent in other BWPs. |

A UE may be configured to monitor multiple POs during a DRX cycle, where the monitored POs may be associated with multiple groups of PDCCH monitoring occasions. In an aspect, the POs to monitor may be associated with the PF with an SFN that may be determined by the formula: $(SFN+PF\_offset) \mod T=(T \div N)*(UE\_ID \mod N)$. The Index (i_s), indicating the start of a set of PDCCH monitoring occasions for the paging DCI in each group, may be determined by: $i\_s=floor (UE\_ID/N) \mod Ns$.

The set of POs monitored by the UE during a DRX cycle may be comprised of the $(i\_s+1)^{th}$ PO selected from each configured group of PDCCH monitoring occasions.

The multiple sets of PDCCH monitoring occasions may be configured by higher layers using broadcast or dedicated signaling.

Figures 10A, 10B:
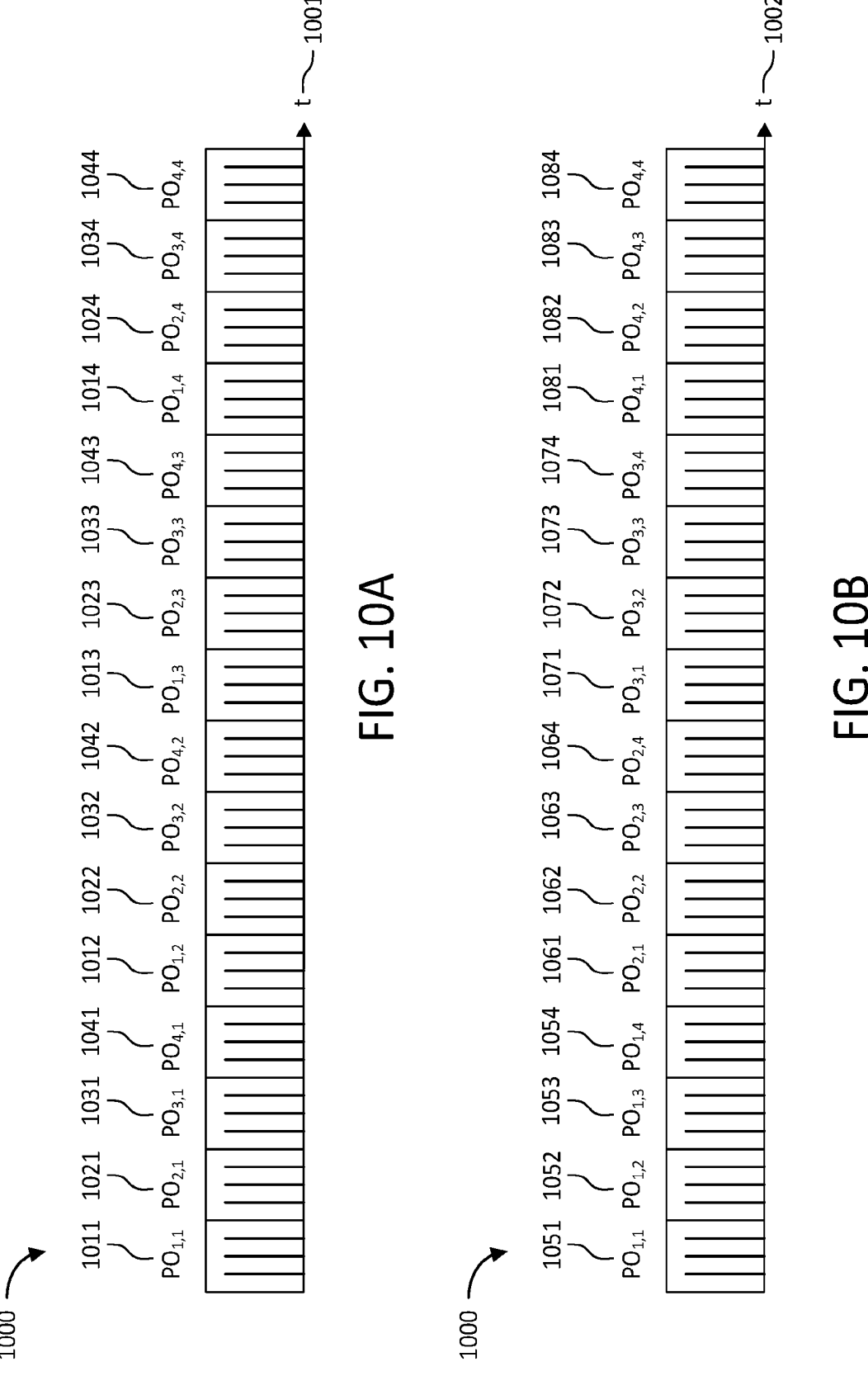
FIG. 10A is a diagram of an example organization of POs from different PDCCH monitoring occasion groups.
FIG. 10B is a diagram of another example organization of POs from different PDCCH monitoring occasion groups.

FIG. 10A is an example 1000 of interleaved POs from different PDCCH monitoring occasion groups in accordance with one embodiment, which may be used in combination with any of the embodiments described herein. Each PO in this example comprises one of more PDCCH monitoring occasions. The example of FIG. 10A shows each PO from different PDCCH monitoring occasion groups interleaved with other POs of other monitoring occasion groups. The PDCCH monitoring occasions in each group may be organized into POs and interleaved with respect to the time domain 1001 as follows: $PO_{1,1}$, $PO_{2,1}$, $PO_{3,1}$, $PO_{4,1}$, $PO_{1,2}$, $PO_{2,2}$, $PO_{3,2}$, $PO_{4,2}$, $PO_{1,3}$, $PO_{2,3}$, $PO_{3,3}$, $PO_{4,3}$, $PO_{1,4}$, $PO_{2,4}$, $PO_{3,4}$, and $PG_{4,4}$. The PO's indexes shown in FIG. 10A are PDCCH Monitoring Occasion Group and PO Number.

FIG. 10B is an example of non-interleaved POs from different PDCCH monitoring occasion groups in accordance with one embodiment, which may be used in combination with any of the embodiments described herein. Each PO in this example comprises one of more PDCCH monitoring occasions. The PDCCH monitoring occasions in each group may be organized into POs with respect to the time domain 1002 as follows: $PO_{1,1}$, $PO_{1,2}$, $PO_{1,3}$, $PO_{1,4}$, $PO_{2,1}$, $PO_{2,2}$, $PO_{2,3}$, $PO_{2,4}$, $PO_{3,1}$, $PO_{3,2}$, $PO_{3,3}$, $PO_{3,4}$, $PO_{4,1}$, $PO_{4,2}$, $PO_{4,3}$, and $PG_{4,4}$. The PO's indexes shown in FIG. 10B are PDCCH Monitoring Occasion Group and PO Number.

For example, thefirstPDCCH-MonitoringOccasionOfPO field included in the PCCH-Config 1E may be defined as shown below to allow the UE to monitor POs associated with up to 4 different groups of PDCCH monitoring occasions:

```
PCCH-Config ::=              SEQUENCE {
    defaultPagingCycle           PagingCycle,
    nAndPagingFrameOffset        CHOICE {
        oneT                         NULL,
        halfT                        INTEGER (0..1),
        quarterT                     INTEGER (0..3),
        oneEighthT                   INTEGER (0..7),
        oneSixteenthT                INTEGER (0..15)
    },
    ns                           ENUMERATED { four, two, one},
    firstPDCCH-MonitoringOccasionOfPO SEQUENCE (SIZE (1...4)) OF CHOICE {
        sCS15KHZoneT
    SEQUENCE (SIZE (1..4)) OF INTEGER (0..139),
        sCS30KHZoneT-SCS15KHZhalfT
    SEQUENCE (SIZE (1..4)) OF INTEGER (0..279),
        sCS60KHZoneT-SCS30KHZhalfT-SCS15KHZquarterT
        SEQUENCE (SIZE (1..4)) OF INTEGER (0..559),
        sCS120KHZoneT-SCS60KHZhalfT-SCS30KHZquarterT-SCS15KHZoneEighthT
            SEQUENCE (SIZE (1..4)) OF INTEGER (0..1119),
        sCS120KHZhalfT-SCS60KHZquarterT-SCS30KHZoneEighthT-
SCS15KHZoneSixteenthT SEQUENCE (SIZE (1..4)) OF INTEGER (0..2239),
        sCS120KHZquarterT-SCS60KHZoneEighthT-SCS30KHZoneSixteenthT
        SEQUENCE (SIZE (1..4)) OF INTEGER (0..4479),
        sCS120KHZoneEighthT-SCS60KHZoneSixteenthT
    SEQUENCE (SIZE (1..4)) OF INTEGER (0..8959),
```

-continued

```
    sCS120KHZoneSixteenthT
SEQUENCE (SIZE (1..4)) OF INTEGER (0..17919)
}   OPTIONAL,           -- Need R
    ...
}
```

TABLE 9

PCCH-Config field descriptions
PCCH-Config field descriptions defaultPagingCycle Default paging cycle, used to derive 'T' in TS 38.304. Value rf32
corresponds to 32 radio frames, rf64 corresponds to 64 radio frames and
so on.
nAndPagingFrameOffset Used to derive the number of total paging frames in T (corresponding to
parameter N in TS 38.304) and paging frame offset (corresponding to
parameter PF_offset in TS 38.304)
ns Number of paging occasions in paging frame
firstPDCCH-MonitoringOccasionOfPO Points out the first PDCCH monitoring occasion of each PO in the PF,
per TS 38.304.

A UE may be configured to monitor multiple POs during a DRX cycle, where the monitored POs may be associated with multiple PFs. In an aspect, the POs to monitor may be associated with PFs with an SFN that may be determined by the formula: $(SFN+PF\_offset_m) \bmod T=(T \text{ div } N)*(UE\_ID \bmod N)$, where $PF\_offset_m$ is the offset associated with the ml PF containing one or more POs to monitor during the DRX cycle. The index (i_s), indicating the start of a set of PDCCH monitoring occasions for the paging DCI in each PF, may be determined by the formula: $i\_s=\text{floor }(UE\_ID/N) \bmod Ns$.

The set of PF_offsets used may be configured by higher layers using broadcast or dedicated signaling. For example, the nAndPagingFrameOffset field included in the PCCH-Config 1E may be defined as follows to allow the UE to monitor POs associated with up to 4 PFs:

```
nAndPagingFrameOffset    CHOICE {
    oneT                 NULL,
    halfT                SEQUENCE (SIZE (1..4)) OF INTEGER (0..1),
    quarterT             SEQUENCE (SIZE (1..4)) OF INTEGER (0..3),
    oneEighthT           SEQUENCE (SIZE (1..4)) OF INTEGER (0..7),
    oneSixteenthT        SEQUENCE (SIZE (1..4)) OF INTEGER
(0..15)
}
```

Figures 11A, 11B:
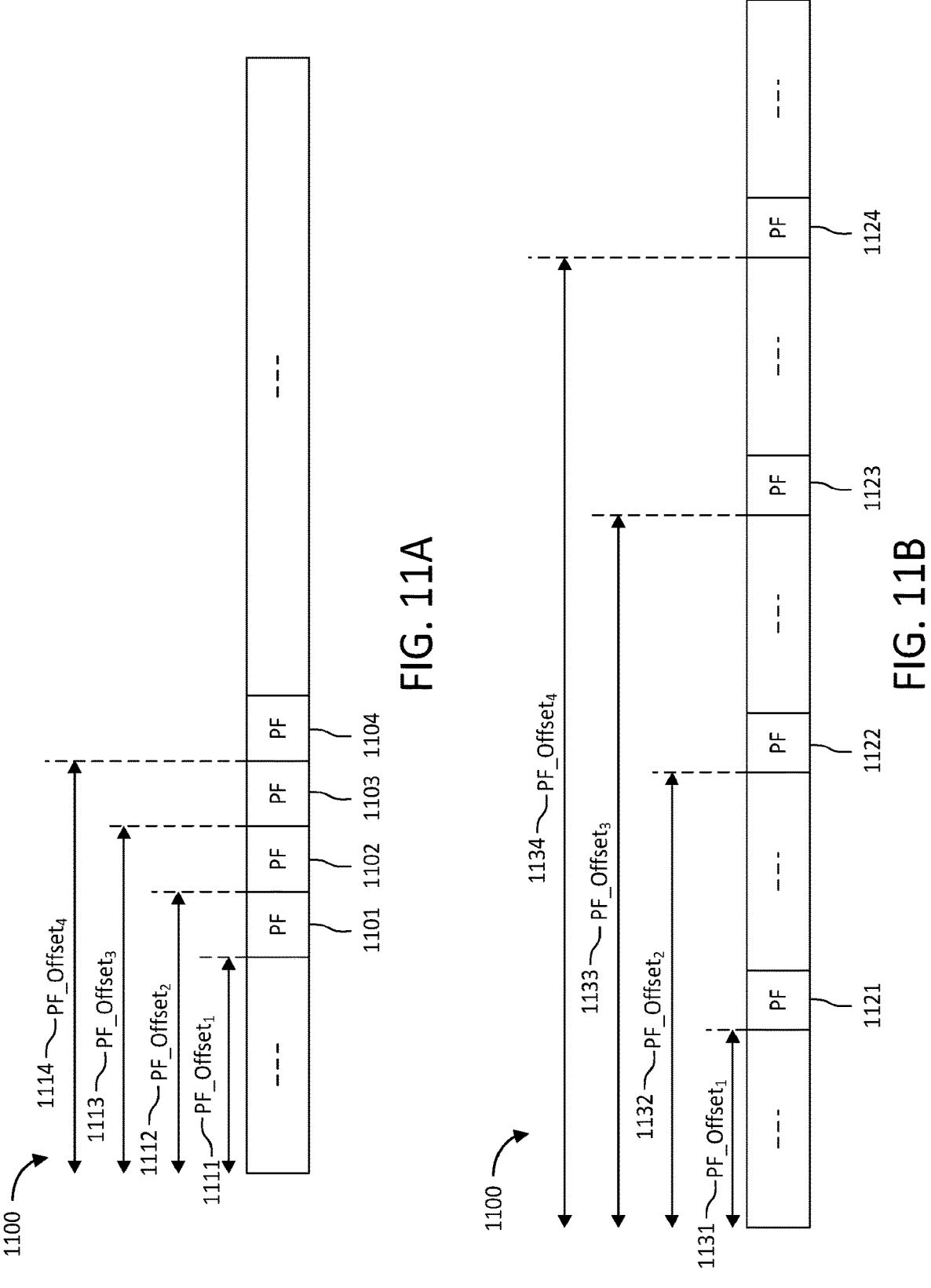
FIG. 11A is an exemplary configuration for monitoring POs in multiple PFs.
FIG. 11B is another exemplary configuration for monitoring POs in multiple PFs.

FIG. 11A is an example 1100 of monitoring contiguous PFs in accordance with one embodiment, which may be used in combination with any of the embodiments described herein. The example of FIG. 11A shows each PF and its offset: PF 1101 and PF_Offset₁ 1111, PF 1102 and PF_Offset₂ 1112, PF 1103 and PF_Offset₃ 1113, and PF 1104 and PF_Offset₄ 1114.

FIG. 1/B is an example of monitoring non-contiguous PFs in accordance with one embodiment, which may be used in combination with any of the embodiments described herein. The example of FIG. 11B shows each PF and its offset: PF 1121 and PF_Offset₁ 1131, PF 1122 and PF_Offset₂ 1132, PF 1123 and PF_Offset₃ 1133, and PF 1124 and PF_Offset₄ 1134.

Rule-based methods may be used to determine additional POs that may be monitored for a DRX cycle. The PF SFN and index i_s corresponding to the first PO to monitor during the DRX cycle may be determined using formulas: $(SFN+PF\_offset) \bmod T=(T \text{ div } N)*(UE\_ID \bmod N)$ and $i\_s=\text{floor }(UE\_ID/N) \bmod Ns$.

The UE may monitor additional POs during the DRX cycle if for example, the UE determines the gNB was unable to acquire the DL channel to transmit the paging DCI during the PO. The UE may use the methods describe herein to determine whether the gNB acquired the DL channel. The use of alternative methods that may be used to determine whether the gNB acquired the DL channel are not precluded (e.g., detection of a Discovery Reference Signal (DRS), Channel Access Indication (CAI) signal or any other signal transmitted by the gNB).

Aspects include methods to monitor next PO. The UE may monitor the next PO associated with PF, where the index of the next PO may be calculated as: i_s$_{next\_PO}$=i_s+1, where i_s<(Ns−1). For scenarios, where the monitored PO is the last PO associated with the PF−i_s=(Ns−1)−the UE may stop monitoring additional POs during the DRX cycle. Alternatively, the UE may monitor a PO associated with the next PF, where the SFN of the next PF may be calculated as: SFN$_{Next\_PF}$=SFN$_{PF}$+floor(T/N).

The UE may monitor up to m POs during a DRX cycle, where the number m may be predefined or configured by layers using broadcast or dedicated signaling. The UE may be configured to monitor more than one PO in a PF.

When the UE detect LBT failure in a PO, where the UE may use the methods describe herein to determine whether the gNB acquired the DL channel or any alternative method (e.g., detection of a Discovery Reference Signal (DRS), CAI signal or any other signal transmitted by the gNB), the UE may monitor within a DRX cycle, up to a maximum of the next additional k consecutive POs that follows the first PO where the UE detects LBT failure. The UE may monitor additional POs until, for example, either the UE detects LBT Success (or equivalently no LBT Failure) or the UE has monitored additional k consecutive POs that follows the first PO where the UE detects LBT failure with no LBT Success. The monitored additional POs may belong to the same PF or may belong to different PFs. Parameter k may be configured to the UE by the gNB, or may be specified to pre-defined value(s). Values of parameter k may depend on, for example, service requirements and/or UE power saving settings/preferences.

In another alternative, when the UE detects LBT failure in a PO, the UE may monitor within a DRX cycle, up to a maximum of the next k additional POs that follows the first PO where the UE detects LBT failure. The additional monitored POs may be separated from each other in time by a time interval, which may be expressed in terms of sub-frames and/or slots and/or mini-slots and/or symbols. The UE may monitor additional POs until, for example, either the UE detects LBT Success (or equivalently no LBT Failure) or the UE has monitored k consecutive POs that follows the first PO where the UE detects LBT failure with no LBT Success. The additional monitored POs may belong to the same PF or may belong to different PFs. Parameter k may be configured to the UE by the gNB, or may be specified to fix value(s). Values of parameter k may depend on, for example, service requirements and/or UE power saving settings/preferences. Similarly, the time interval between additional monitored POs may be configured to the UE by the gNB, or may be specified to pre-defined value(s). Values of the timer interval between additional monitored POs may depend on for e.g. services requirements and/or UE power saving settings/preferences.

When the UE detects LBT failure in a PDCCH monitoring opportunity within a PO, the UE may monitor within a DRX cycle, typically, up to a maximum of next k consecutive additional PDCCH monitoring opportunities that follows the first PDCCH monitoring opportunity where the UE detects LBT failure. The UE may monitor additional PDCCH opportunities, for example, until either the UE detects LBT Success (or equivalently no LBT Failure) or the UE has monitored additional k consecutive PDCCH monitoring opportunities that follows the first PDCCH opportunity where the UE detects LBT failure with no LBT Success. The additional consecutive PDCCH monitoring opportunities may belong to the same PO and/or the same PF or may belong to different PO and/or different PFs. Furthermore, the additional consecutives PDCCH opportunities may be structured so as to be indexed as consecutive PDCCH opportunities in time domain and/or in frequency domain. Parameter k may be configured to the UE by NB, or may be specified to pre-defined value(s). Values of parameter k may depend on for e.g. services requirements and/or UE power saving setting/preferences.

When the UE detect LBT failure in a PDCCH monitoring opportunity within a PO, the UE may monitor within a DRX cycle, typically, up to a maximum of next k PDCCH monitoring opportunities that follows the first PDCCH monitoring opportunity where the UE detects LBT failure. The monitored PDCCH opportunities may be separated from each other in time by a configurable time interval and/or in frequency domain by a configuration distance. In time domain, the distance between PDCCH monitoring opportunities may be expressed in terms of subframe and/or slot and/or mini-slots and/or symbols. The UE may monitor PDCCH until, for example, either the UE detects LBT Success (or equivalently no LBT Failure) or the UE has monitored k consecutive PDCCH monitoring opportunities that follows the first PDCCH monitoring opportunity where the UE detects LBT failure with no LBT Success. The monitored PDCCH monitoring opportunities may belong to the same PO and/or the same PF or may belong to different PO and/or different PFs. Furthermore, the consecutives PDCCH opportunities may be structured so as to be indexed as consecutive PDCCH opportunities in time domain and/or in frequency domain. In this case, distance between additional PDCCH monitoring opportunities within a DRX cycle may be expressed in terms of the difference between two additional PDCCH monitoring opportunities. Parameter k may be configured to the UE by NB, or may be specified to fix value(s). Values of parameter k may depend on, for example, service requirements and/or UE power saving setting/preferences. Similarly, time interval between additional monitored POs may be configured to the UE by NB, or may be specified to pre-defined value(s). Values of timer interval between additional monitored POs may depend on, for example, service requirements and/or UE power saving setting/preferences.

The UE may monitor POs configured for multiple Paging BWPs during a PO, where a Paging BWP is a BWP on which a UE may monitor the PDCCH for paging. A common paging configuration may be used for each paging BWP. Alternatively, the configuration used for each paging BWP may be configured independently. In an aspect, if the gNB acquires access to more than one Paging BWP configured for a given UE during a PO, the gNB may page the UE on all the Paging BWPs for which access was acquired. The UE may then attempt to receive the paging DCI on any of the Paging BWPs for which the UE may determine the gNB was able to access. Alternatively, the Paging BWPs may be ranked and if the gNB acquires access to more than one Paging BWP configured for a given UE during a PO, the gNB may page the UE using the Paging BWP with the highest rank. The UE may then attempt to receive the paging DCI on the highest ranked Paging BWP for which the UE may determine the gNB was able to access. The same procedures may also be applied for scenarios where the DL channel may be partitioned into subbands—the UE may monitor POs configured for multiple paging subbands during a PO.

When determining the number of POs a UE may monitor per DRX cycle, there may be a tradeoff between paging reliability and UE power consumption. Increasing the number of POs a UE monitors per DRX cycle may improve the paging reliability, but also may increase the UE power consumption. In general, to optimize the power consumption, a UE may only monitor subsequent POs during a DRX cycle under certain conditions.

Figure 12:
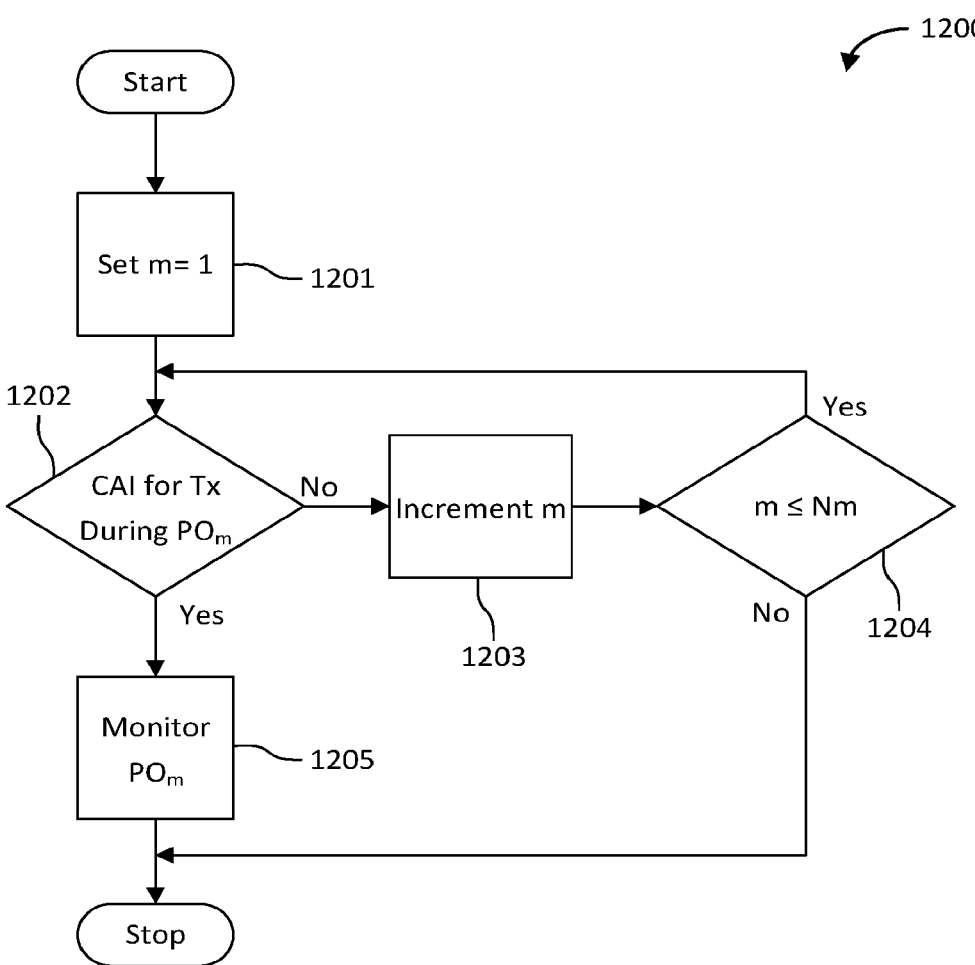
FIG. 12 is a flow diagram of an example algorithm that may determine if subsequent POs should be monitored.

FIG. 12 is a flow diagram of an example algorithm 1200 that may determine if subsequent POs should be monitored in accordance with one embodiment, which may be used in combination with any of the embodiments described herein. The UE may only monitor subsequent POs during a DRX cycle when the UE detects that the gNB was unable acquire access to the DL channel for transmission of the paging DCI. In the example of FIG. 12, $PO_1$ may correspond to the $i^{th}$ monitored PO in the DRX cycle, where i=1 may be the first monitored PO in the DRX cycle, i=2 may be the second monitored PO in the DRX cycle, etc. The $i^{th}$ monitored PO in the DRX cycle may not necessarily correspond to the $(i\_s_m+1)^{th}$ PO when i=m. Referring to FIG. 12, m be set to 1 (step 1201). If the UE detects a CAI during $PO_m$ (step 1202), the UE monitors the $PO_m$ (step 1205). Otherwise the UE increments m (step 1203) and repeats the process if m≤Nm (step 1204).

The same mechanism is also applicable for determining the number of PDCCH monitoring occasions to monitor for aspects where a PO is comprised of multiple sweeps/repetitions, e.g. an extended PO.

In some configurations, the paging capacity may be not sufficient to page all the UEs that may need to be paged during a given PO. In this scenario, it may be preferable for the UE to monitor subsequent POs during the DRX cycle. To enable such behavior, in an aspect, the gNB may provide an indication to the UE to signal when the paging capacity was not sufficient to page all the UEs that need to be page during a given PO and that subsequent POs should be monitored. In an aspect, the paging DCI may include a field such as Paging Capacity Exceeded, as shown in Table 10 below, to indicate the paging capacity was not sufficient to page all the UEs that may need to be paged during the PO.

TABLE 10

| NR-U Paging DCI | | |
| --- | --- | --- |
| Field Name | # Bits | Comment |
| Short Messages Indicator | 2 | As defined in Table 2. |
| Short Messages | 8 | If only the scheduling information for Paging is carried, this bit field is reserved. |
| Frequency domain resource assignment | $\lceil log_2(N_{RB}^{DL,BWP}(N_{RB}^{DL,BWP} + 1)/2)\rceil$ | If only the short message is carried, this bit field is reserved. |
| Time domain resource assignment | 4 | As defined in TS 38.214. If only the short message is carried, this bit field is reserved. |
| VRB-to-PRB mapping | 1 | As defined in TS 38.212. If only the short message is carried, this bit field is reserved. |
| Modulation and coding scheme | 5 | As defined in TS 38.214. If only the short message is carried, this bit field is reserved. |
| TB scaling | 2 | As defined in TS 38.214. If only the short message is carried, this bit field is reserved. |
| Paging Capacity Exceeded | 1 | Set to 1 to indicate the paging capacity was not sufficient to page all the UEs that need to be paged during the PO. If only the short message is carried, this bit field is reserved. |
| Reserved | 6 | |

Figure 13:
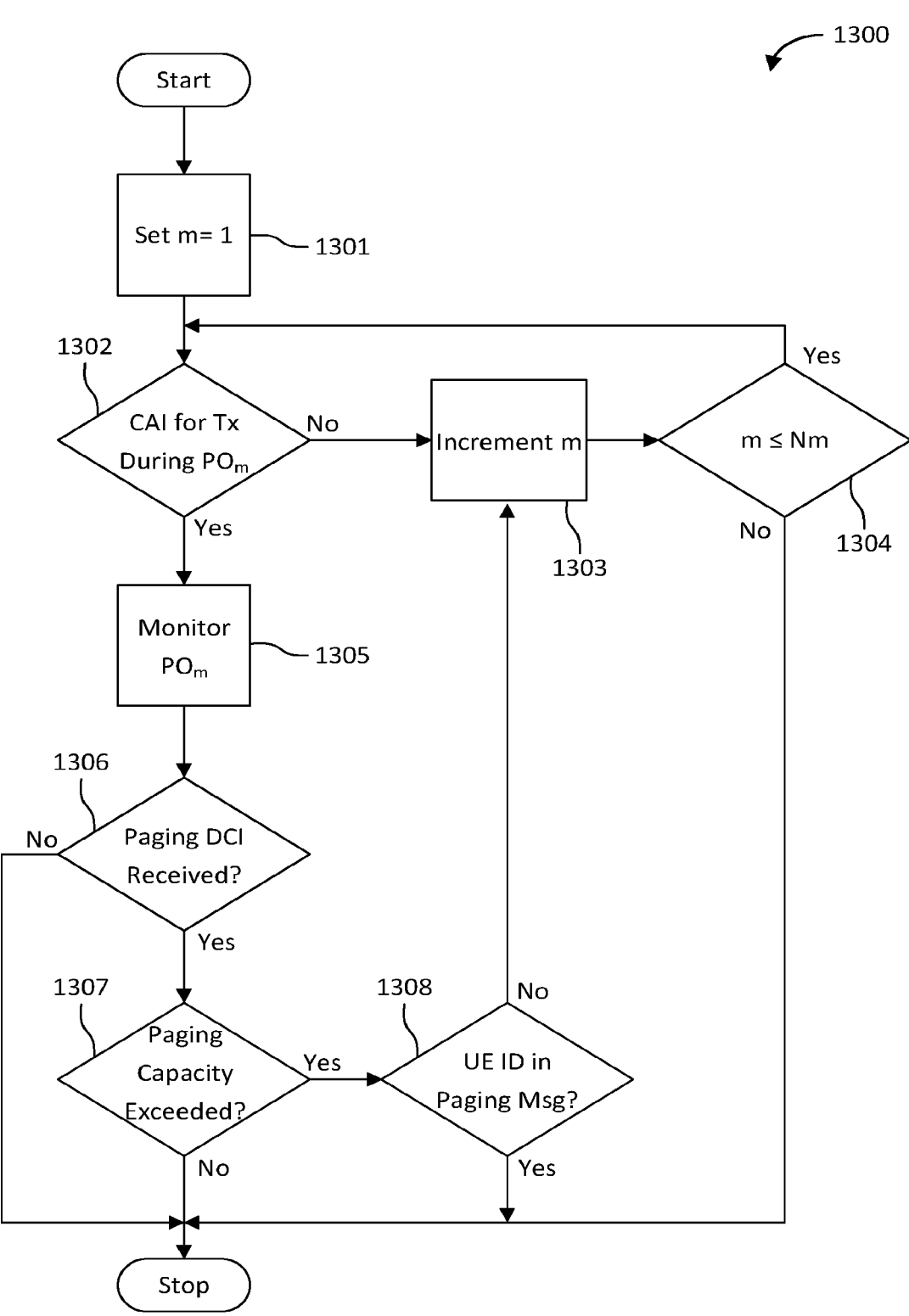
FIG. 13 is a flow diagram of an alternative example algorithm that may determine if subsequent POs should be monitored.

FIG. 13 is a flow diagram of an example algorithm 1300 that may determine if subsequent POs should be monitored in accordance with one embodiment, which may be used in combination with any of the embodiments described herein. The example algorithm 1300 of FIG. 13 may check whether the paging capacity was exceeded for the PO and whether the UE ID was included in the Paging Message when determining whether the UE should monitor subsequent POs during a DRX cycle. Alternatively, this indication may be included as a field in the Paging Message signaled via the RRC. $PO_1$ may correspond to the $i^{th}$ monitored PO in the DRX cycle, where i=1 may be the first monitored PO in the DRX cycle, i=2 may be the second monitored PO in the DRX cycle, etc. The $i^{th}$ monitored PO in the DRX cycle may not necessarily correspond to the $(i\_s_m+1)^{th}$ PO when i=m. Referring to FIG. 13, m be set to 1 (step 1301). If the UE detects a CAI during $PO_m$ (step 1302), the UE monitors the $PO_m$ (step 1305). Otherwise the UE increments m (step 1303) and repeats the process if m≤Nm (step 1304). The UE may determine whether a paging DCI is received (step 1306). If the paging DCI is received, the UE may determine whether the paging capacity is exceeded (step 1306). If the paging capacity is exceeded, the UE may determine whether the UE ID is in the paging message (step 1308).

For an NR, a PO may be a set of PDCCH monitoring occasions, each may be corresponding to a fixed time instance (e.g., one or more OFDM symbols) within a PF, where paging DCI may be sent. If the gNB is not able to acquire the DL channel prior to the start of the first PDCCH monitoring occasion in the PO, the gNB may have to wait an entire DRX cycle before attempting to page the UE again, even if the channel becomes idle shortly after the start of the PO—for example a few symbols after the start of the PO. To reduce the latency associated with paging a UE for NR-U, in an aspect, a PO may be defined such that it may begin at a flexible starting point within a paging monitoring window.

Figure 14:
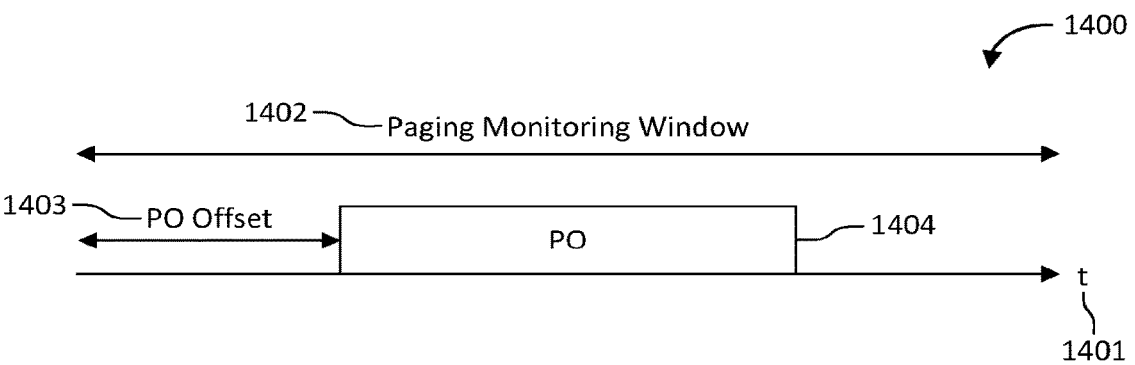
FIG. 14 is a diagram of an example paging monitoring window.

FIG. 14 is a diagram of an example paging monitoring window 1400 in accordance with one embodiment, which may be used in combination with any of the embodiments described herein. The starting point of the PO 1404, i.e., the PO Offset 1403, may be defined to occur at a flexible location (e.g., symbol/slot x) within the paging monitoring window 1402, where the maximum value of PO Offset 1403 may be specified or may be configured by higher layers using broadcast or dedicated signaling, e.g., as a field included in the PCCH-Config 1E.

In multi-beam operations, the length of one PO may be defined as one or more periods of beam sweeping and the UE may assume that the same paging message is repeated in all beams of the sweeping pattern. A PO may then be defined as a set of $S=(N_{SSB}\times M)$ consecutive PDCCH monitoring occasions, where $N_{SSB}$ may be the number of actual transmitted SSBs determined according to the parameter ssb-PositionsInBurst in SystemInformationBlock1 and M may be the number of sweeps used for paging transmissions. The $K^{th}$ PDCCH monitoring occasion for paging in the PO may correspond to the $(K \bmod N_{SSB})^{th}$ transmitted SSB.

Figure 15:
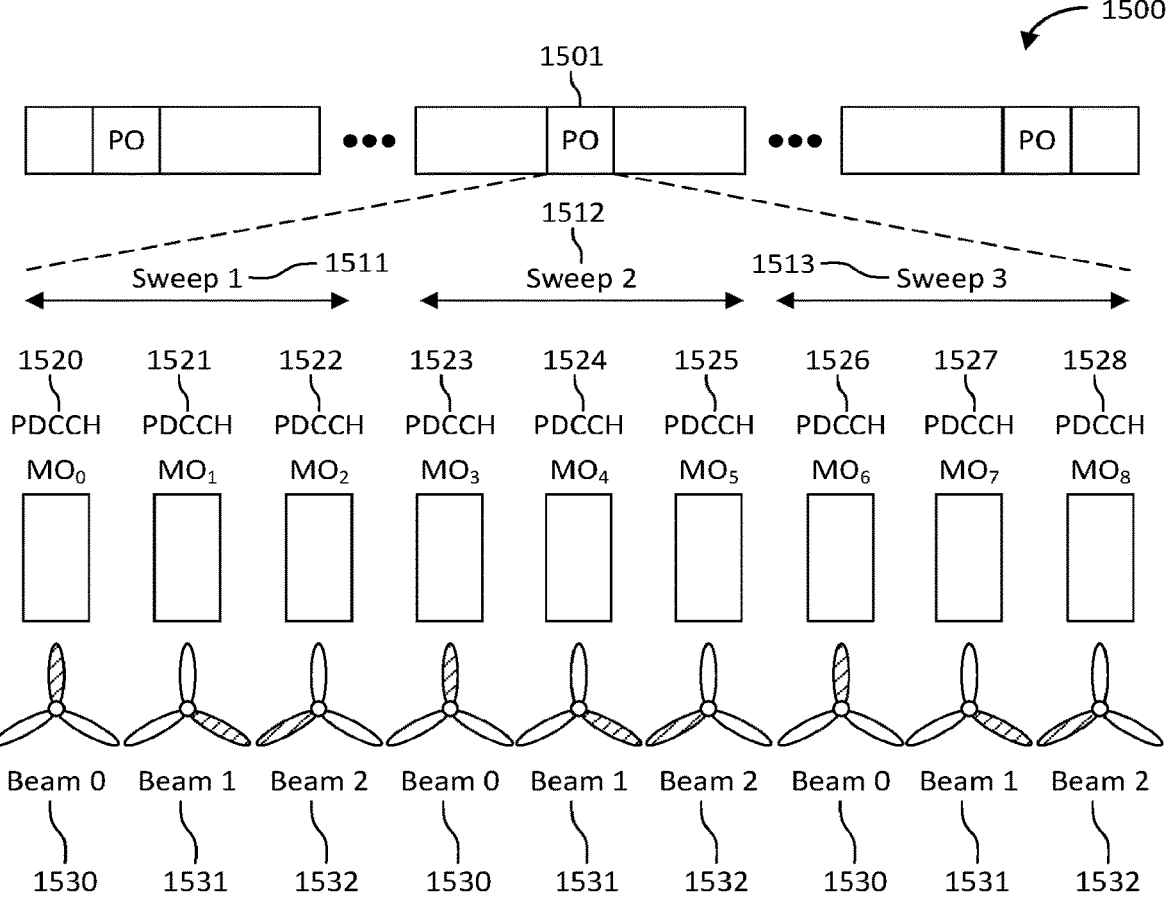
FIG. 15 is a diagram of an example PO for scenario with multiple sweeps.

FIG. 15 is a diagram of an example a PO for the scenario where $N_{SSB}$=3 and M=3 1500 in accordance with one embodiment, which may be used in combination with any of the embodiments described herein. FIG. 15 shows PO 1501 comprising a plurality of sweeps: sweep 1 1511, sweep 2 1512, and sweep 3 1513. Sweep 1 1511 comprises PDCCH $MO_0$ 1520 sweeping beam 0 1530, PDCCH $MO_1$ 1521 sweeping beam 1 1531, and PDCCH $MO_2$ 1522 sweeping beam 2 1532. Sweep 2 1512 comprises PDCCH $MO_3$ 1523 sweeping beam 0 1530, PDCCH $MO_4$ 1524 sweeping beam 1 1531, and PDCCH $MO_5$ 1525 sweeping beam 2 1532. Sweep 3 1513 comprises PDCCH $MO_6$ 1526 sweeping beam 0 1530, PDCCH $MO_7$ 1527 sweeping beam 1 1531, and PDCCH $MO_8$ 1528 sweeping beam 2 1532.

Alternatively, a PO may be defined as a set of $S=(N_{SSB}\times R)$ consecutive PDCCH monitoring occasions, where $N_{SSB}$ may be the number of actual transmitted SSBs determined according to the parameter ssb-PositionsInBurst in System-InformationBlock1 and R may be the number of repetitions used for paging transmissions. In this example, the $K^{th}$ PDCCH monitoring occasion for paging in the PO may correspond to the $(floor(K/R))^{th}$ transmitted SSB.

Figure 16:
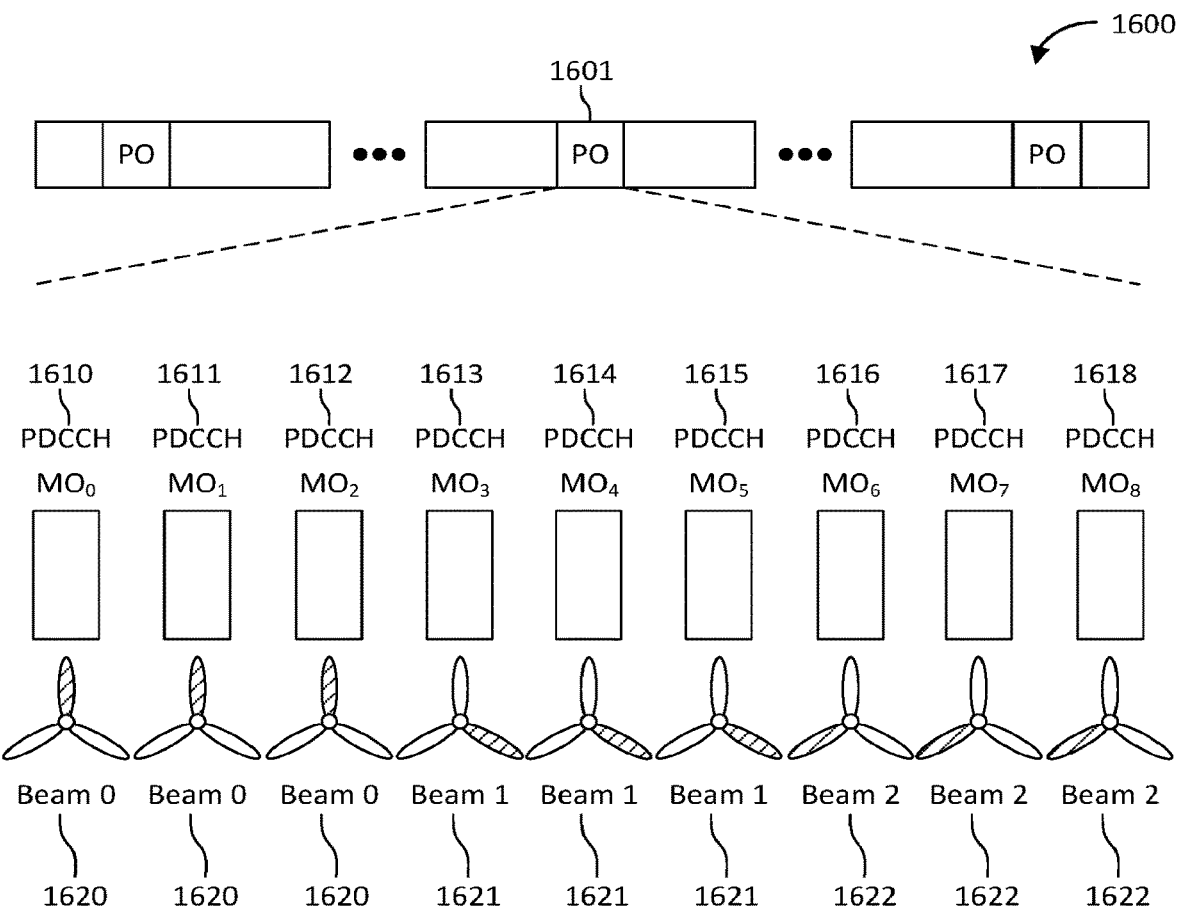
FIG. 16 is a diagram of an example PO for scenario with repetition.

FIG. 16 is a diagram of an example a PO for the scenario where $N_{SSB}$=3 and R=3 1600 in accordance with one embodiment, which may be used in combination with any of the embodiments described herein. FIG. 16 shows PO 1601 comprising a plurality of MOs: PDCCH $MO_0$ 1610 sweeping beam 0 1620, PDCCH $MO_1$ 1611 sweeping beam 0 1620, and PDCCH $MO_2$ 1612 sweeping beam 0 1620, PDCCH $MO_3$ 1613 sweeping beam 1 1621, PDCCH $MO_4$ 1614 sweeping beam 1 1621, and PDCCH $MO_5$ 1615 sweeping beam 1 1621, PDCCH $MO_6$ 1616 sweeping beam 2 1622, PDCCH $MO_7$ 1617 sweeping beam 2 1622, and PDCCH $MO_8$ 1618 sweeping beam 2 1622.

In yet another aspect, a PO may be defined as a set of $S=(N_{SSB}\times R\times M)$ consecutive PDCCH monitoring occasions, where $N_{SSB}$ may be the number of actual transmitted SSBs determined according to the parameter ssb-PositionsInBurst in SystemInformationBlock1, R may be the number of repetitions used for paging transmissions and M may be the number of sweeps used for paging transmissions. In this example, the $K^{th}$ PDCCH monitoring occasion for paging in the PO may correspond to the $(floor((K \bmod (N_{SSB}\times R))/R))^{th}$ transmitted SSB.

Figure 17:
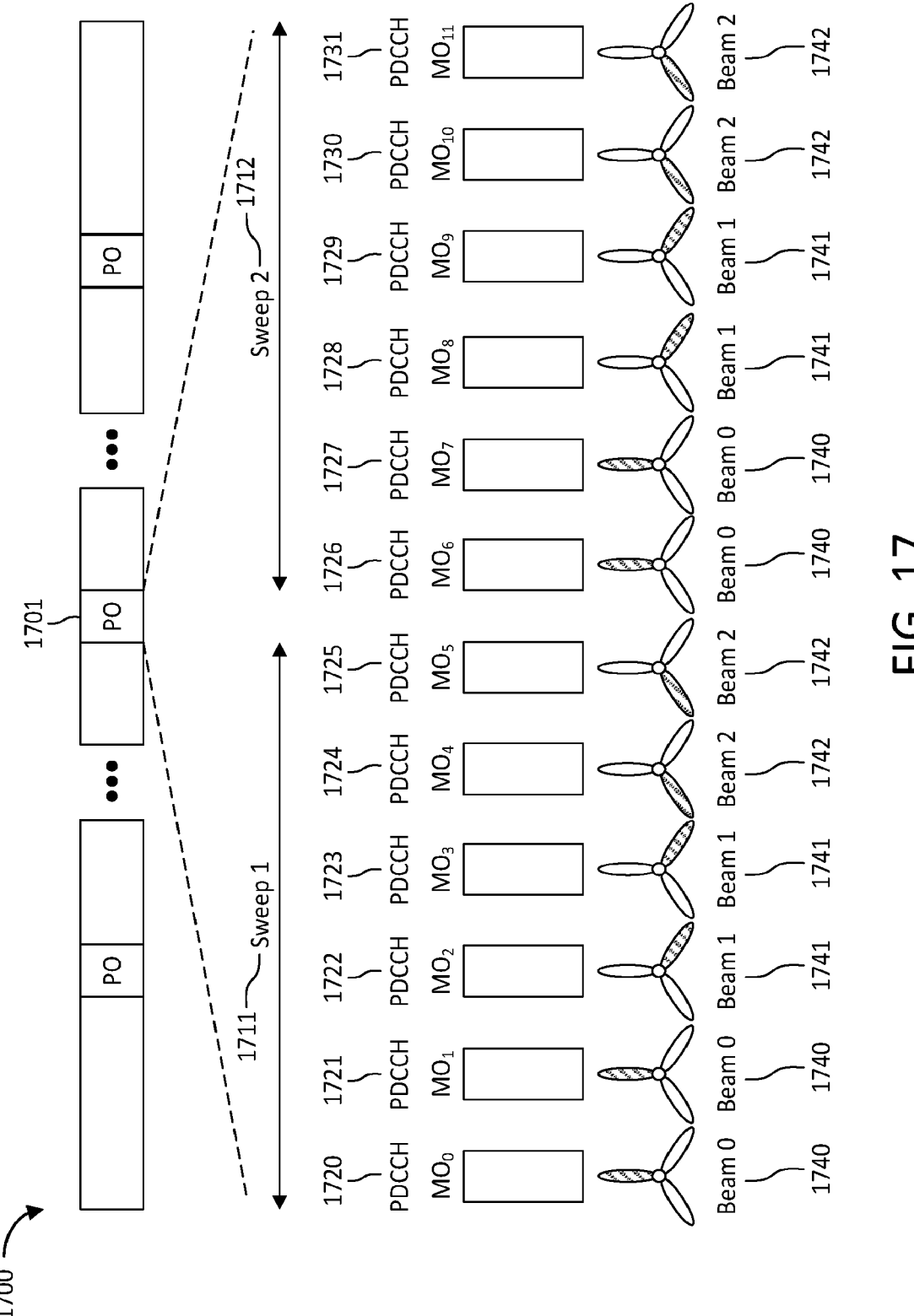
FIG. 17 is a diagram of an example PO for scenario with multiple sweeps and/or repetition.

FIG. 17 is a diagram of an example a PO for the scenario where $N_{SSB}$=3, R=2 and M=2 1700 in accordance with one embodiment, which may be used in combination with any of the embodiments described herein. FIG. 17 shows PO 1701 comprising a plurality of sweeps: sweep 1 1711 and sweep 2 1712. Sweep 1 1711 comprises PDCCH $MO_0$ 1720 sweeping beam 0 1740, PDCCH $MO_1$ 1721 sweeping beam 0 1740, PDCCH $MO_2$ 1722 sweeping beam 1 1741, PDCCH $MO_3$ 1723 sweeping beam 1 1741, PDCCH $MO_4$ 1724 sweeping beam 2 1742, and PDCCH $MO_5$ 1725 sweeping beam 2 1742. Sweep 2 1712 comprises PDCCH $MO_6$ 1726 sweeping beam 0 1740, PDCCH $MO_7$ 1727 sweeping beam 0 1740, PDCCH $MO_8$ 1728 sweeping beam 1 1741, PDCCH $MO_9$ 1729 sweeping beam 1 1741, PDCCH $MO_{10}$ 1730 sweeping beam 2 1742, and PDCCH $MO_{11}$ 1731 sweeping beam 2 1742.

The parameters M and/or R may be signaled via higher layers, e.g. RRC. For example, the PCCH-Config field included in the DownlinkConfigCommonSIB IE may be used to signal these parameters. The parameters may take on integer values that are consecutive or non-consecutive. For illustrative purposes, the scenario where the parameters M and R may be set to a value equal to 1, 2, 4 or 8 is considered herein. The parameters may be signaled using a PCCH-Config field defined as shown below. In this example, when the parameters M and R are not explicitly signaled, a default value of 1 may be assumed. Extensions to other parameters signaled via the IE, e.g. support for additional SCS's, Ns values, N values, PF offset values, etc. may also be conducted in the similar way as illustrated below.

```
PCCH-Config ::= SEQUENCE {
    defaultPagingCycle      PagingCycle,
    nAndPagingFrameOffset               CHOICE {
        oneT      NULL,
        halfT      INTEGER (0..1),
        quarterT         INTEGER (0..3),
        oneEighthT       INTEGER (0..7),
        oneSixteenthT    INTEGER (0..15)
    },
    Ns      ENUMERATED {four, two, one},
    firstPDCCH-MonitoringOccasionOfPO           CHOICE {
        sCS15KHZoneT
            SEQUENCE (SIZE (1..maxPO-perPF)) OF INTEGER (0..139),
        sCS30KHZoneT-SCS15KHZhalfT
            SEQUENCE (SIZE (1..maxPO-perPF)) OF INTEGER (0..279),
        sCS60KHZoneT-SCS30KHZhalfT-SCS15KHZquarterT
            SEQUENCE (SIZE (1..maxPO-perPF)) OF INTEGER (0..559),
        sCS120KHZoneT-SCS60KHZhalfT-SCS30KHZquarterT-
SCS15KHZoneEighthT
            SEQUENCE (SIZE (1..maxPO-perPF)) OF INTEGER (0..1119),
        sCS120KHZhalfT-SCS60KHZquarterT-SCS30KHZoneEighthT-
SCS15KHZoneSixteenthT
            SEQUENCE (SIZE (1..maxPO-perPF)) OF INTEGER (0..2239),
        sCS120KHZquarterT-SCS60KHZoneEighthT-SCS30KHZoneSixteenthT
            SEQUENCE (SIZE (1..maxPO-perPF)) OF INTEGER (0..4479),
        sCS120KHZoneEighthT-SCS60KHZoneSixteenthT
            SEQUENCE (SIZE (1..maxPO-perPF)) OF INTEGER (0..8959),
        sCS120KHZoneSixteenthT
            SEQUENCE (SIZE (1..maxPO-perPF)) OF INTEGER (0..17919)
    } OPTIONAL,      -- Need R
    ...,
    M      ENUMERATED {2, 4, 8} OPTIONAL, --NEED S
    R      ENUMERATED {2, 4, 8} OPTIONAL, --NEED S
}
```

In the above embodiments, the notation used to refer to the number of transmitted SSBs that is determined according to the parameter ssb-PositionsInBurst in SystemInformationBlock1 may correspond the parameter S instead of $N_{SSB}$. This alternate notation corresponds to the PO being defined as a set of (S×M), (S×R) or (S×R×M) consecutive PDCCH monitoring occasions for the aspects described herein.

A PO defined according to aspects of the methods to perform paging using a PO comprised of multiple sweeps/repetitions described herein may be referred to as an extended PO. For example, the aspect where a PO is defined as a set of (S×M) consecutive PDCCH monitoring occasions is considered herein. The additional PDCCH monitoring occasions that comprise a PO for the scenario where M>1 can be viewed as the extensions to the PO.

Figure 18:
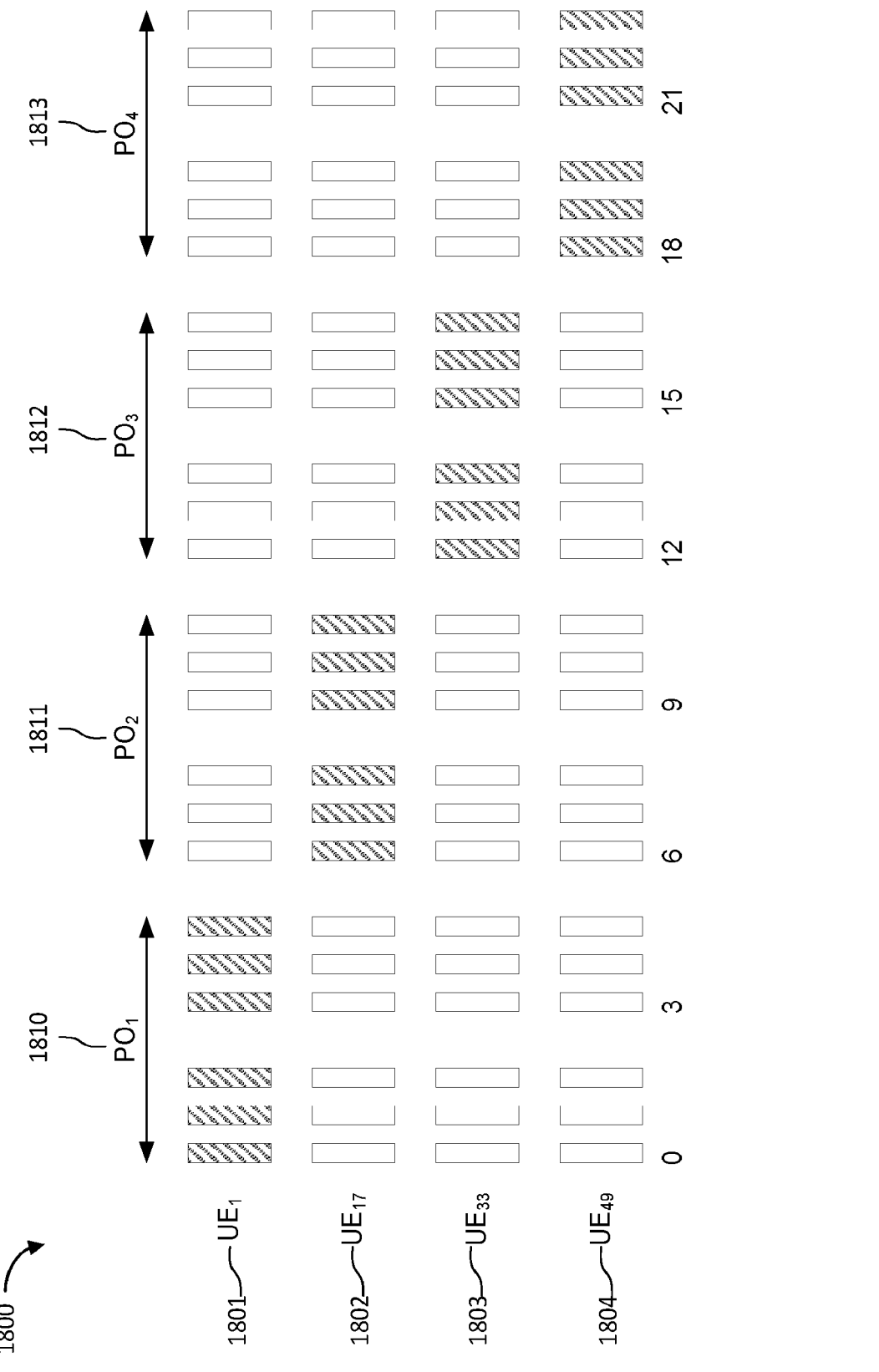
FIG. 18 is a diagram of an extended PO where T=32, N=16, Ns=4, M=2 and S=3.

FIG. 18 is example 1800 of monitoring extended POs in accordance with one embodiment, which may be used in combination with any of the embodiments described herein. Referring to FIG. 18, a plurality of extended POs 1810, 1811, 1812, and 1813 are shown. UE1 1801 may monitor PDCCH monitoring occasions during extended PO 1810 and does not monitor during extended POs 1811, 1812, and 1813. UE17 1802 may monitor PDCCH monitoring occasions during extended PO 1811 and does not monitor during extended POs 1810, 1812, and 1813. UE33 1803 may monitor PDCCH monitoring occasions during extended PO 1812 and does not monitor during extended POs 1810, 1811, and 1813. UE49 1804 may monitor PDCCH monitoring occasions during extended PO 1813 and does not monitor during extended POs 1810, 1811, and 1812.

The $K^{th}$ PDCCH monitoring occasion for paging in set m of the PO corresponds to the $K^{th}$ transmitted SSB, where m=1,2, . . . , M is the $m^{th}$ set of consecutive PDCCH monitoring occasions in the PO. This may also be referred to as the $[(m-1)*S+K]^{th}*$PDCCH monitoring occasion for paging in the PO.

When the parameter firstPDCCH-MonitoringOccasionOfPO is present in the configuration provided by higher layers; e.g. PCCH-Config, the starting PDCCH monitoring occasion number of the $(i\_s+1)^{th}$ PO is the $(i\_s+1)^{th}$ value of the firstPDCCH-MonitoringOccasionOfPO parameter; otherwise, it is equal to $i\_s*S*M$.

Table 11 shows the results of the i_s calculation for an extended PO and the starting PDCCH monitoring occasion number of the $(i\_s+1)^{th}$ PO for 4 different UEs for the scenario where T=32, N=16, Ns=4, M=2 and S=3. In this example, the SFN for the PF is the same for each UE, but each UE is distributed to a different PO in the PF, and therefore monitors a different set of PDCCH monitoring occasions for paging as illustrated in FIG. 18.

TABLE 11 i_s and Starting PDCCH Monitoring Occasion Number Calculations for Extended PO where T = 32, N = 16, Ns = 4, M = 2 and S = 3

| UE_ID | i_s | Starting PDCCH Monitoring Occasion Number of PO |
|---|---|---|
| 1 | 0 | 0 |
| 17 | 1 | 6 |
| 33 | 2 | 12 |
| 49 | 3 | 18 |

To optimize the power consumption, the UE is not required to monitor subsequent PDCCH monitoring occasions corresponding to the same PO if it determines the gNB acquired access to the channel during a monitored PDCCH occasion, where the UE may make use if use any of the methods to signal DL channel access indication for paging described herein.

For example, if the UE receives a PDCCH transmission with CRC scrambled by P-RNTI in a PDCCH monitoring occasion for a PO, the UE can assume the gNB was able to access the channel; and is therefore not required to monitor subsequent PDCCH monitoring occasions corresponding to the same PO.

For NR, the gNB may only transmit the paging DCI when one or more UEs need to be paged during a PO. If a UE fails to detect DCI format 1_0 with CRC scrambled by P-RNTI during the PO, it may assume it was not paged and may enter DRX until the next PO. In an aspect, for NR-U, the gNB behavior may be modified such that the paging DCI may be transmitted during every PO whether or not any UEs need to be paged during the PO. If a UE fails to detect DCI format 1_0 with CRC scrambled by P-RNTI during the PO, it may then assume the gNB was not able to access the DL channel to transmit the paging DCI and the UE may adapt its behavior accordingly using the methods described herein. If the paging DCI is received by a UE during the PO, the paging DCI may be processed according to its contents the short message is read if present in the DCI, the PDSCH carrying the Paging message is decoded if scheduling information for Paging is present in the DCI.

To handle the scenario where the paging DCI is transmitted but there aren't any UEs paged, the gNB may indicate the short message is present in the DCI and the bits of the short message field may be set to a predefined value that may indicate that no UEs are paged, where the predefined value may be specified.

Alternatively, the Short Message Indicator field may be defined as shown in Table 12 to indicate this scenario. And in yet another alternative, the paging DCI may include a field, e.g., Paging Indicator, to indicate if any of the UEs were paged.

TABLE 12

NR-U Short Message Indicator

| Bit Field | Description |
|---|---|
| 00 | Neither scheduling information for Paging nor short message are present in the DCI |
| 01 | Only scheduling information for Paging is present in the DCI |
| 10 | Only short message is present in the DCI |
| 11 | Both scheduling information for Paging and short message are present in the DCI |

Figure 19:
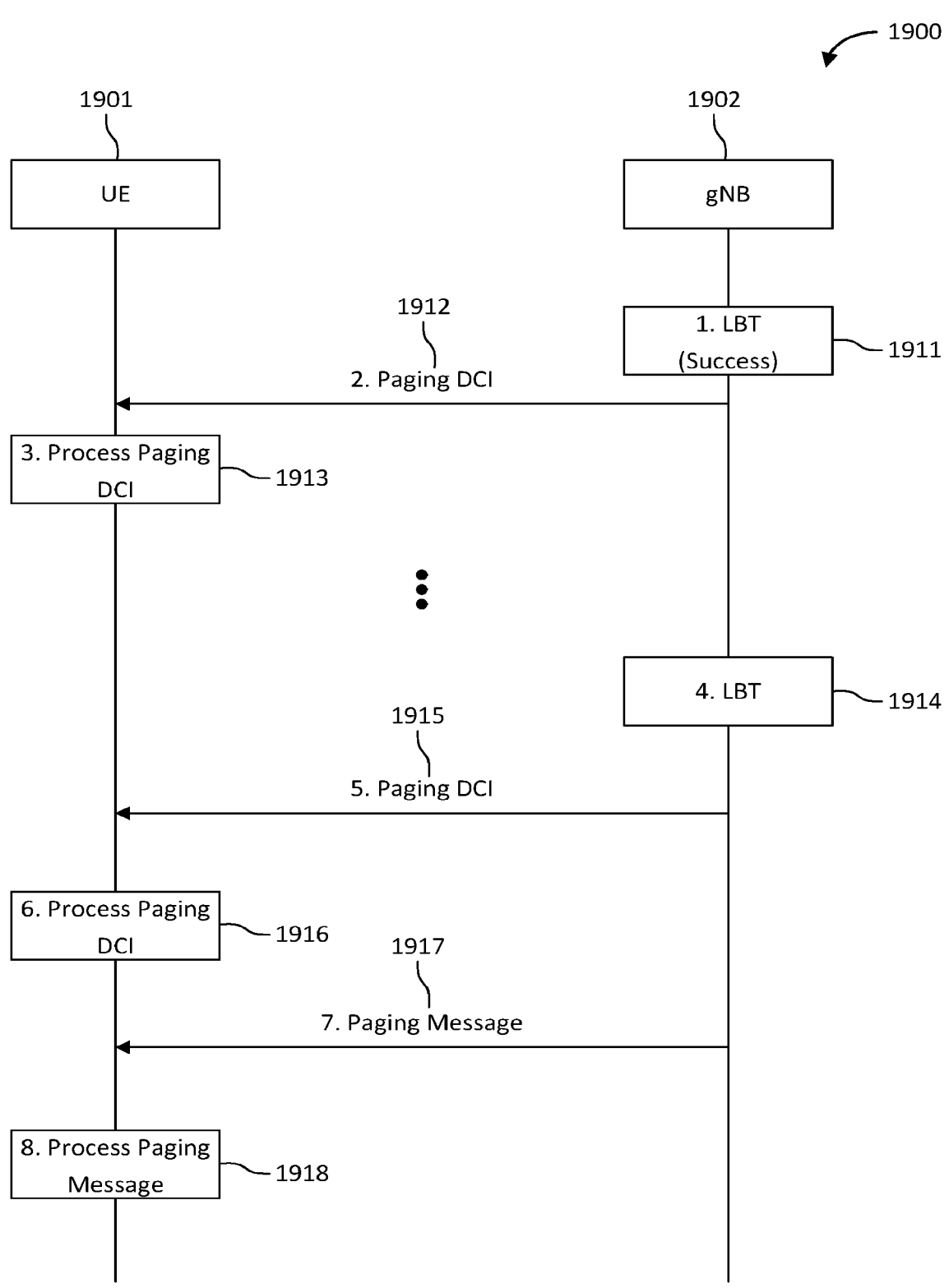
FIG. 19 is a diagram of an example procedure to signal DL channel access indication for paging using the paging DCI (LBT success on 1st attempt)

FIG. 19 is a flow diagram for an example procedure 1900 to signal a DL CAI for paging using the paging DCI in accordance with one embodiment, which may be used in combination with any of the embodiments described herein. In the example of FIG. 19, the gNB acquires access to the DL channel on the first attempt. Referring to FIG. 19, the gNB 1902 may perform LBT on the DL and acquires access to the channel (step 1911). The gNB 1902 may transmit the paging DCI during the PO using the mechanisms proposed herein to indicate there aren't any UEs being paged (step 1912). The UE 1901 may process the paging DCI and may determine there are not any UEs being paged and enters DRX (step 1913). During a subsequent DRX cycle, the gNB 1902 may perform LBT on the DL and acquires access to the channel (step 1914). The gNB 1902 may transmit the paging DCI during the PO using the mechanisms proposed herein to indicate there are one or more UEs being paged (step 1915). The UE 1901 may process the paging DCI, may determine there are one or more UEs being paged, and may prepare to the receive the PDSCH carrying the Paging Message (step 1916). The gNB 1902 may transmits the Paging Message (step 1917). The UE 1901 may process the Paging Message and may (re)-establish a connection with the network if it was paged (i.e., if the Paging Message includes a Paging Record with the UE's identity), otherwise, the UE enters DRX (step 1918).

Figure 20:
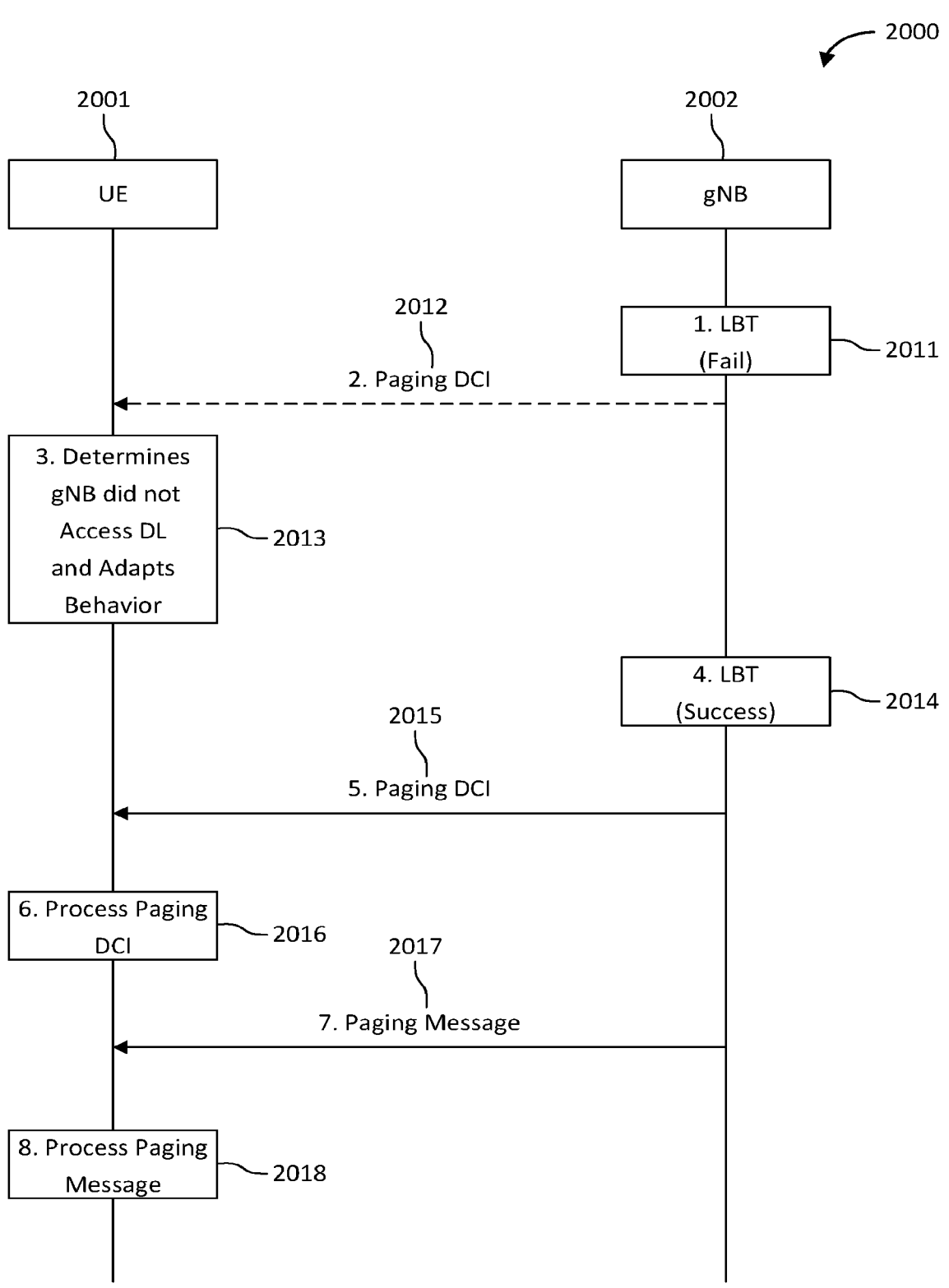
FIG. 20 is a diagram of an example procedure to signal DL channel access indication for paging using the paging DCI (LBT success on 2nd attempt)

FIG. 20 is a flow diagram for another example procedure 2000 to signal a DL CAI for paging using the paging DCI in accordance with one embodiment, which may be used in combination with any of the embodiments described herein. In the example of FIG. 20, the gNB does not acquire access to the channel on the first attempt but acquires access to the DL channel on the second attempt. Referring to FIG. 20, the gNB 2002 performs LBT on the DL but fails to acquire access to the channel (step 2011). The gNB 2002 does not transmit the paging DCI (step 2012). The UE 2001 fails to decode the paging DCI and determines the gNB was not able to access the DL channel for transmission of the paging DCI, where the UE may adapt its behavior for monitoring of subsequent POs using the mechanisms described herein (step 2013). During the same DRX cycle, the gNB 2002 may perform LBT on the DL and acquires access to the channel (step 2014). The gNB 2002 may transmit the paging DCI for a subsequent PO using the mechanisms proposed herein to indicate there are one or more UEs being paged (step 2015). The UE 2001 may process the paging DCI, may determine there are one or more UEs being paged, and may prepare to receive the PDSCH carrying the Paging Message (step 2016). The gNB 2002 may transmit the Paging Message (step 2018). The UE 2001 may process the Paging Message and may (re)-establish a connection with the network if it was paged (i.e., if the Paging Message includes a Paging Record with the UE's identity), otherwise, the UE enters DRX (step 2018).

In other alternatives, the UE may determine the gNB acquired access to the channel if in any of the search space sets monitored during the PO the UE receives a PDCCH or detects a signal transmitted by the gNB, e.g. CAI signal, Demodulation Reference Signal (DMRS), etc.

In one aspect, a DCI-based CAI may be used. A new DCI format comprised of parameters to indicate the Channel Occupancy Time (COT) as shown in Table 13 may be defined and transmitted on a PDCCH masked with a RNTI used for indicating DL channel access; e.g. CAI-RNTI.

TABLE 13

NR-U Channel Access DCI

| Field Name | Comment |
|---|---|
| COT Duration | The length of the COT. |
| Subbands | The subbands on which channel access has been acquired. |

In another aspect, Discovery Reference Signal (DRS) transmitted by the gNB may be used to indicate the gNB has acquired access to the channel. The DRSs may be transmitted in symbols prior to the PO and may also include channel access information; e.g. COT duration, subbands on which channel access has been acquired, etc., thereby allowing the UE to determine during which PDCCH monitoring occasions the gNB will have access to the channel.

Prior to paging a UE for NR-U, the gNB may perform LBT. If the gNB is not able to acquire the channel during the PO configured for a given UE, the gNB may have to wait an entire DRX cycle before attempting to page the UE again. In an aspect, to reduce the latency associated with paging a UE if the gNB is not able to acquire the channel during a PO configured for a given UE, the DRX cycle may be dynamically reduced, so the gNB may not have to wait an entire DRX cycle before attempting to page the UE again. The reduced DRX cycle may remain in effect for a given amount of time or until an event occurs; e.g., the gNB is able to acquire the channel for a number of consecutive POs. Thereafter, the DRX cycle may be dynamically increased to the original value or to an intermediate value that may then remain in effect for a given amount of time or until an event occurs.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 21A:
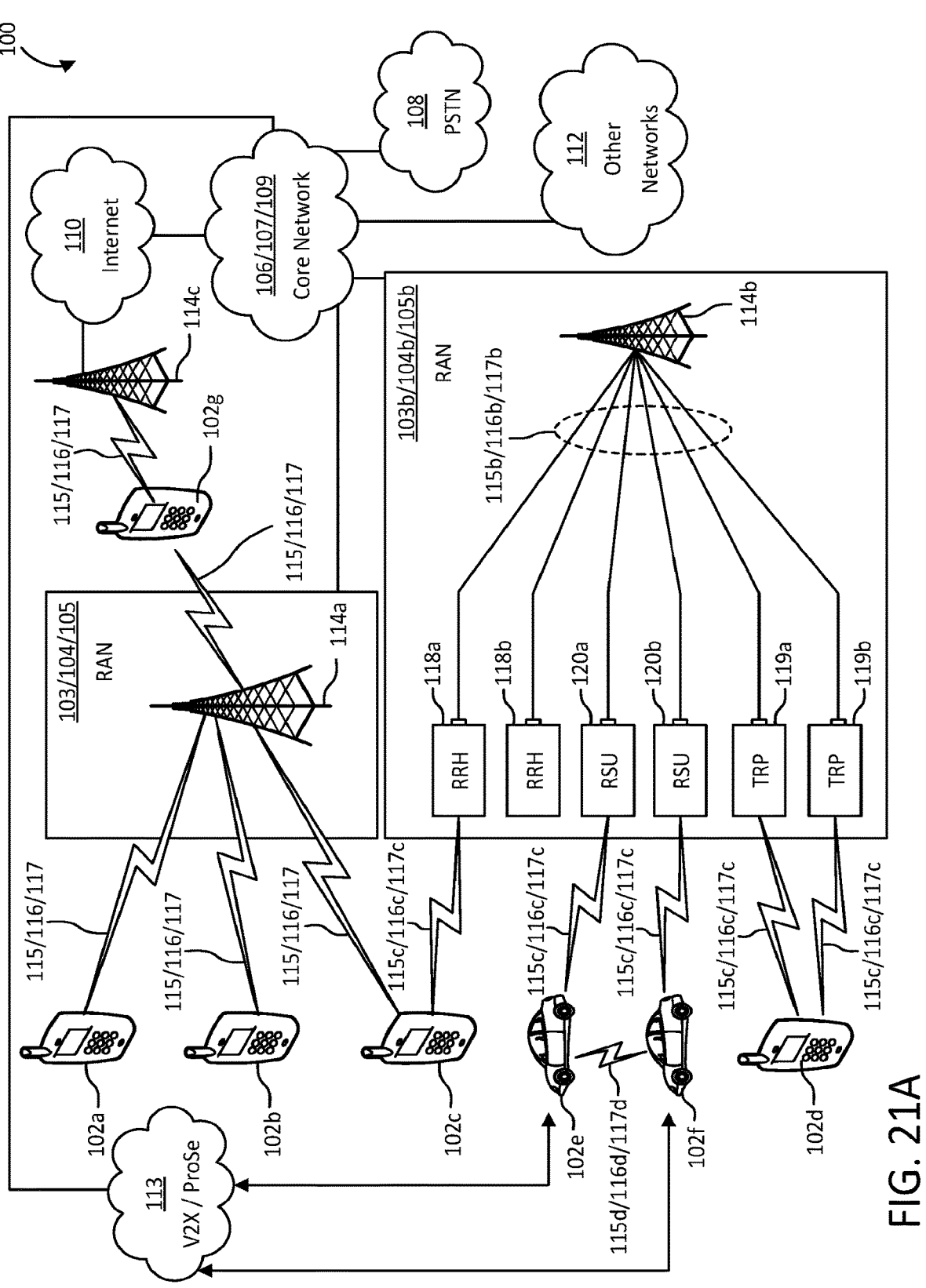
FIG. 21A illustrates one embodiment of an example communications system in which the methods and apparatuses described and claimed herein may be embodied.

FIG. 21A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 21A-21E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*,102*d*, 102*e*, 102*f*, and/or 102*g* may communicate with one another over an air interface 115*d*/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 21A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 21A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 21A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 21A may be configured to communicate with the base station 114a, which may employ a cellular-based radio technology, and with the base station 114c, which may employ an IEEE 802 radio technology.

Figure 21B:
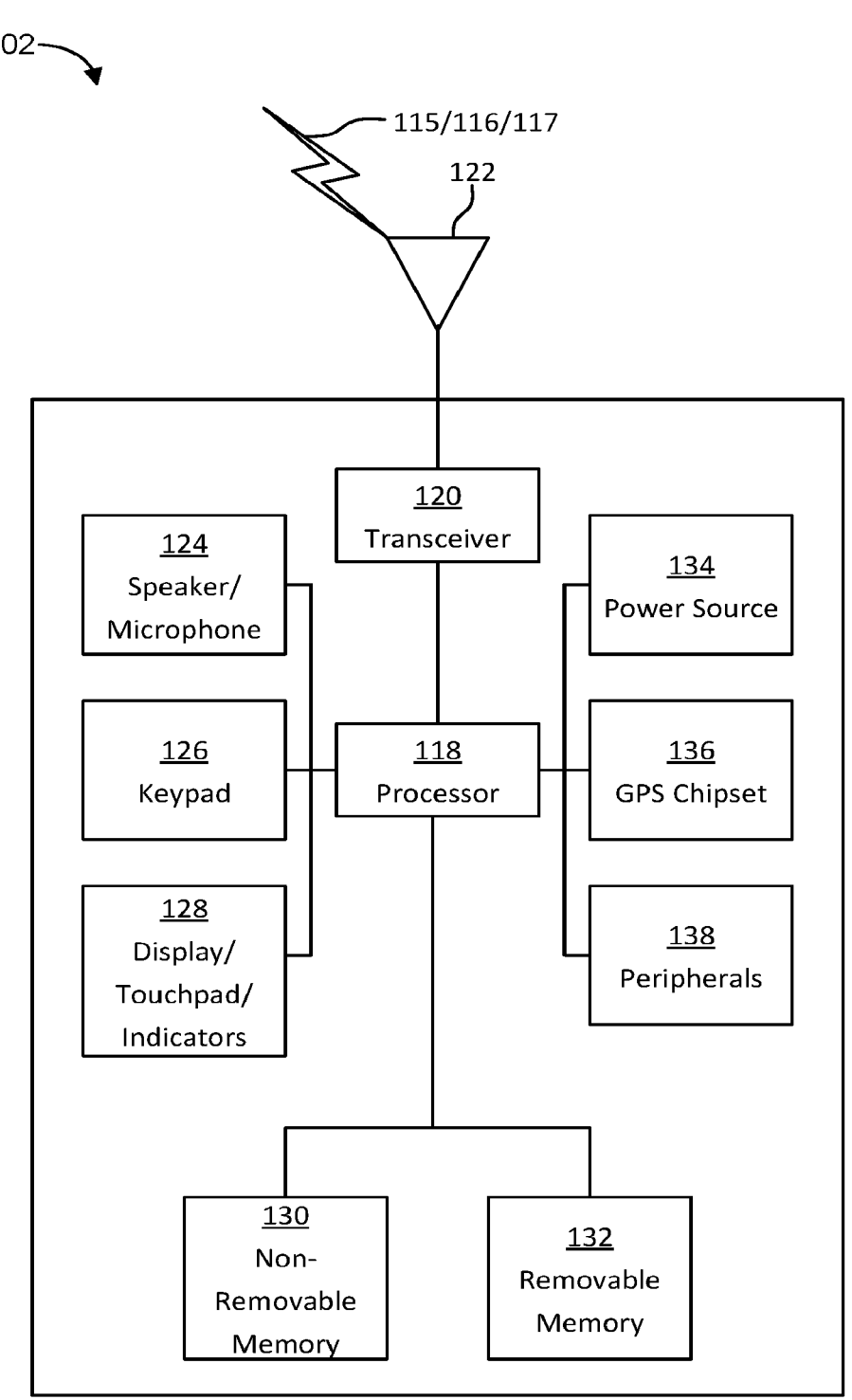
FIG. 21B is a block diagram of an example apparatus or device configured for wireless communications in accordance with the embodiments illustrated herein, such as for example, a wireless transmit/receive unit (WTRU)

FIG. 21B is a block diagram of an example apparatus or device configured for wireless communications in accordance with the embodiments illustrated herein, such as for example, a WTRU 102. As shown in FIG. 21B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 21B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 21B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 21C:
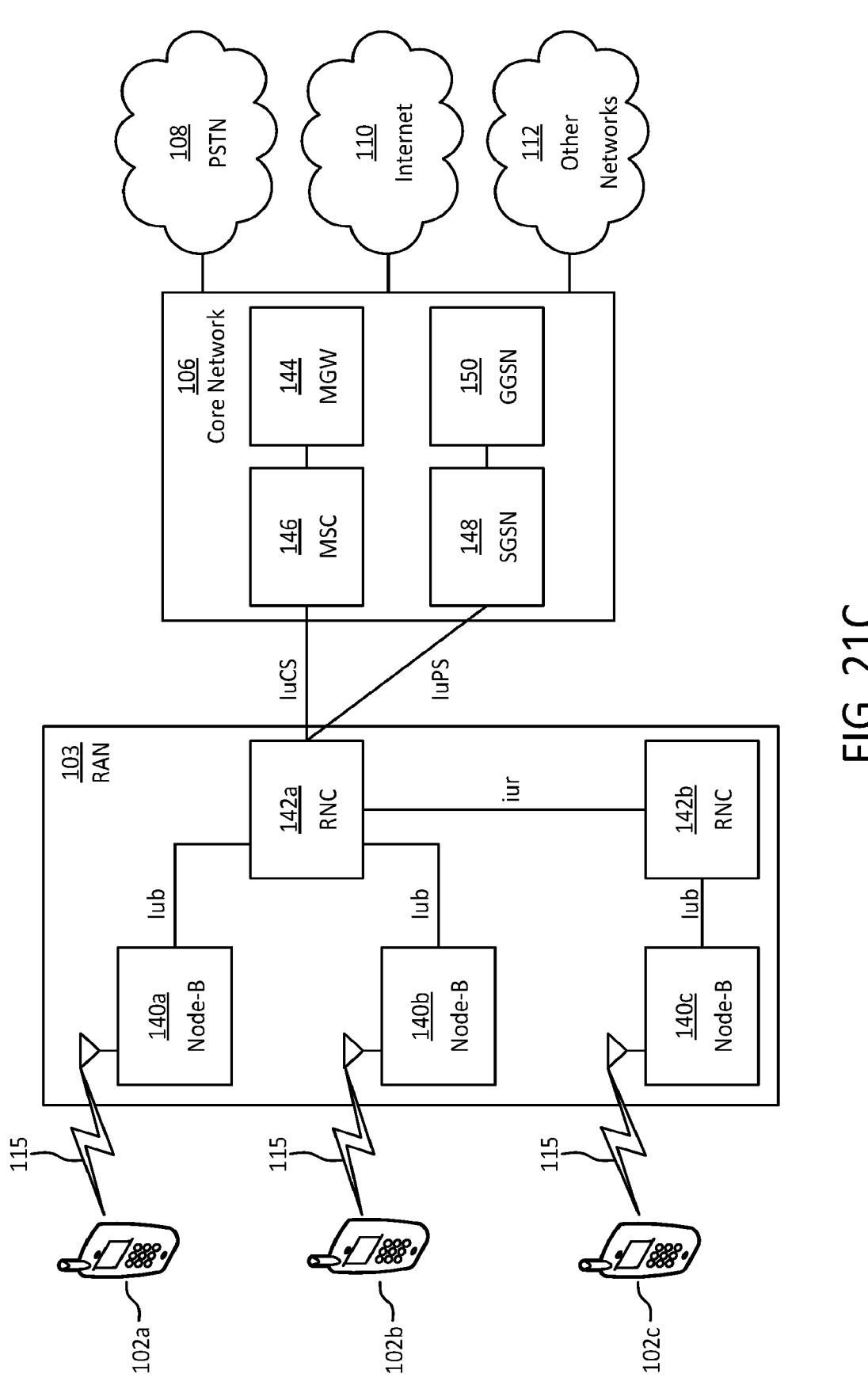
FIG. 21C is a system diagram of a RAN and a core network according to an embodiment.

FIG. 21C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 21C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 21C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 21C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface.

The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 21D:
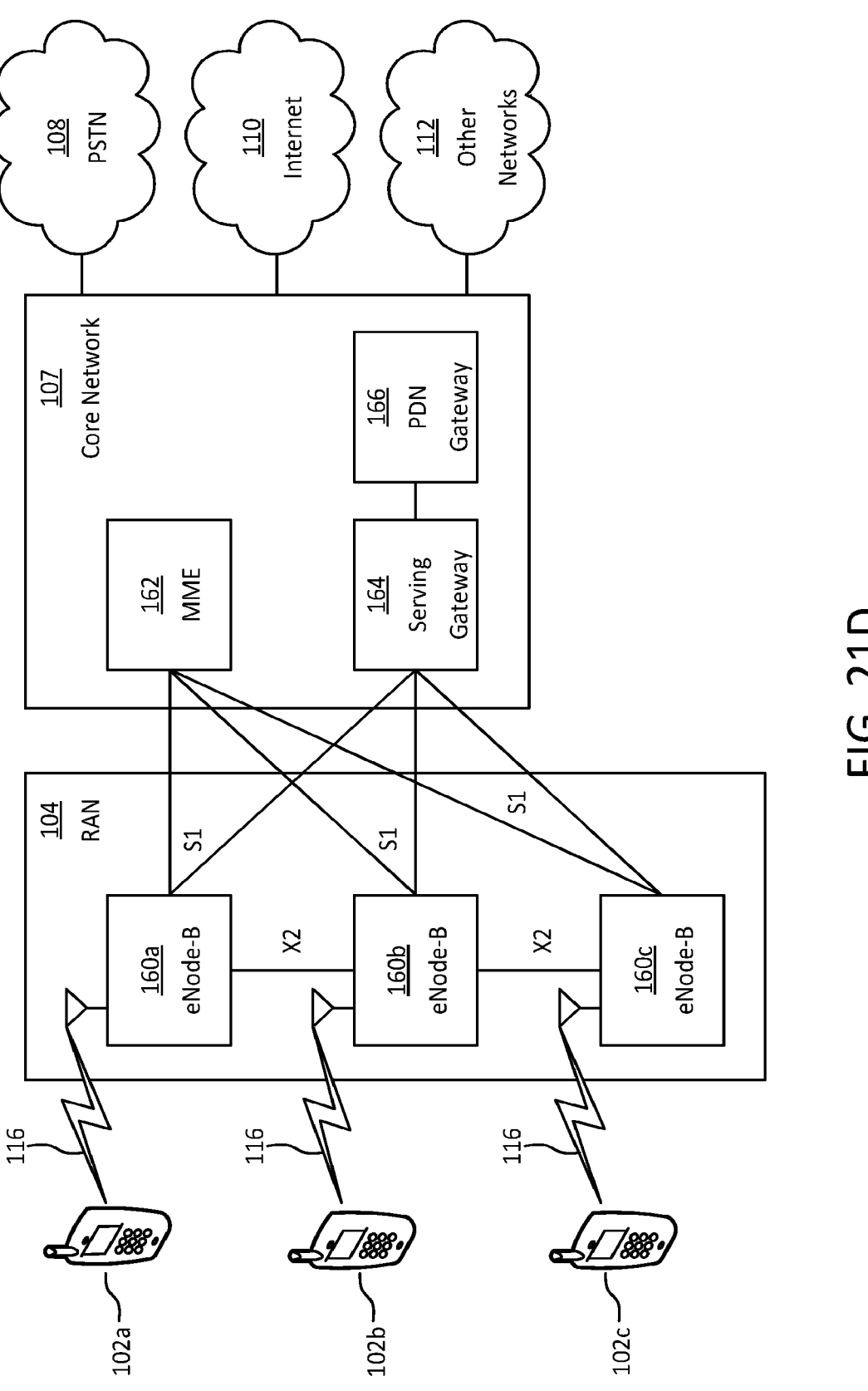
FIG. 21D is a system diagram of a RAN and a core network according to an embodiment.

FIG. 21D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 21D, the eNode-Bs 160a, 160b, 160c may communicate with one another over an X2 interface.

The core network 107 shown in FIG. 21D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 21E:
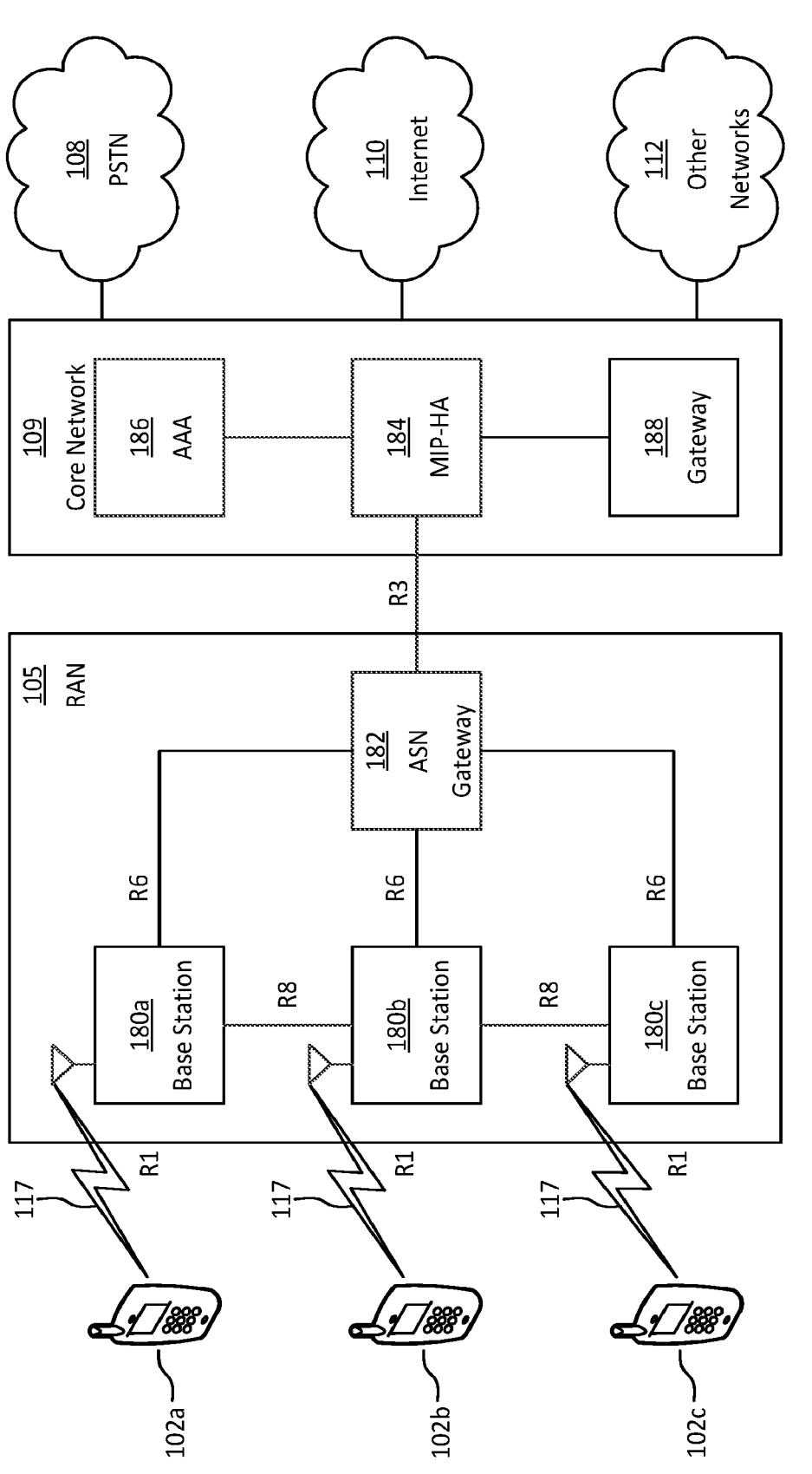
FIG. 21E is a system diagram of a RAN and the core network according to an embodiment.

FIG. 21E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 21E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 21E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 21E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 21A, 21C, 21D, and 21E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 21A, 21B, 21C, 21D, and 21E are provided by way of example only, and it is understood that the subject matter disclosed and claimed herein may be embodied or implemented in any similar communication system, whether presently defined or defined in the future.

Figure 21F:
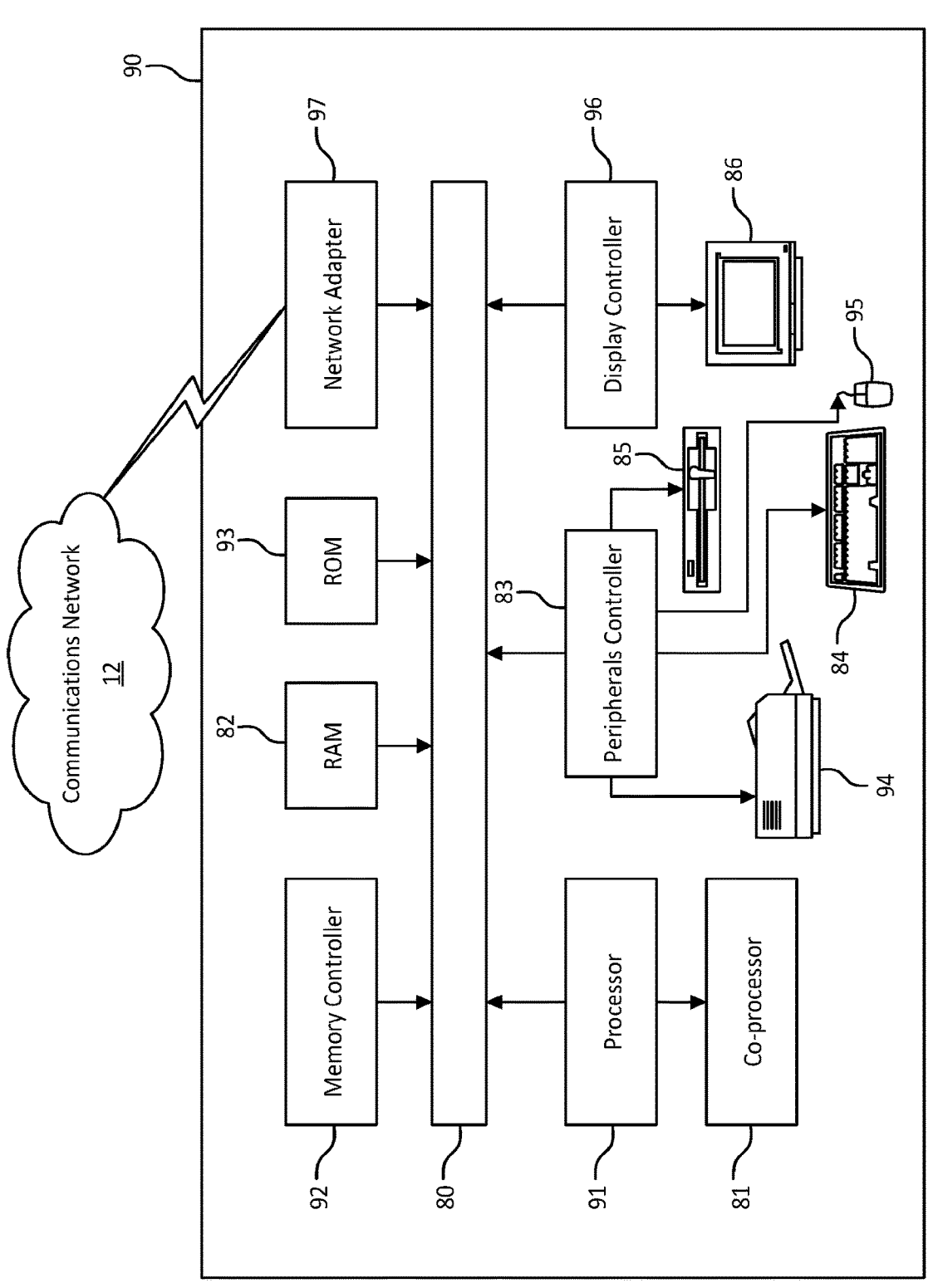
FIG. 21F is a block diagram of an exemplary computing system in which one or more apparatuses of the communications networks illustrated in FIGS. 21A, 21C, 21D and 21E may be embodied.

FIG. 21F is a block diagram of an exemplary computing system 90 in which one or more apparatuses of the communications networks illustrated in FIGS. 21A, 21C, 21D and 21E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 21A, 21B, 21C, 21D, and 21E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 21G:
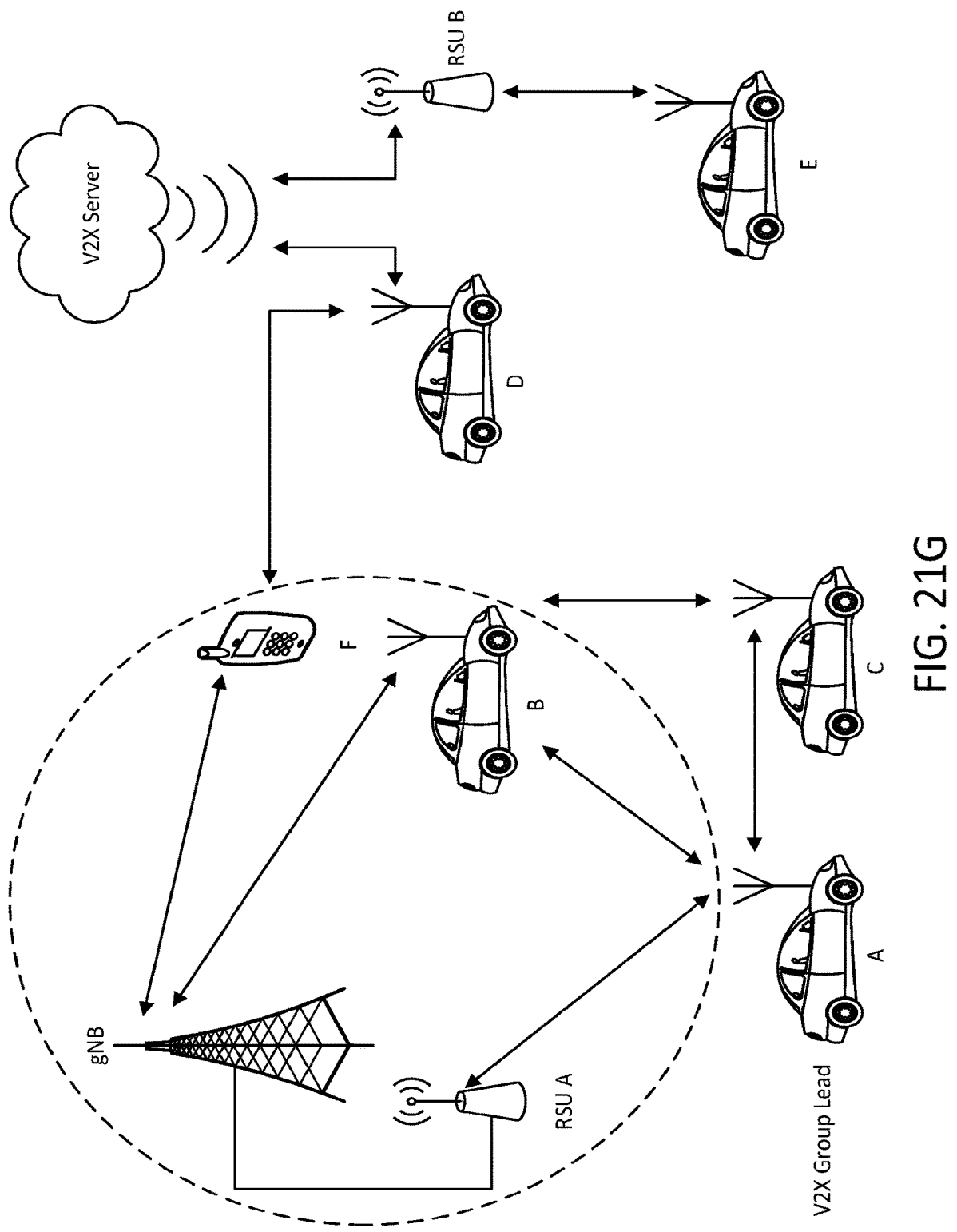
FIG. 21G illustrates one embodiment of an example communications system in which the methods and apparatuses described and claimed herein may be embodied.

FIG. 21G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU) comprising a processor configured to:

receive a physical downlink control channel (PDCCH) transmission during at least one paging occasion for the WTRU, wherein the at least one paging occasion for the WTRU is determined based on an identifier associated with the WTRU, and the at least paging occasion for the WTRU is associated with a plurality of PDCCH monitoring occasions; and determine downlink control information (DCI) from the PDCCH transmission, wherein the DCI comprises a short message, the short message indicating that the WTRU can stop monitoring for subsequent PDCCH transmissions in remaining PDCCH monitoring occasions corresponding to the at least one paging occasion for the WTRU.

2. The WTRU of claim 1, wherein the DCI is associated with a cyclic redundancy check (CRC) scrambled with a paging radio network temporary identifier (P-RNTI).

3. The WTRU of claim 2, wherein the DCI comprises a short message indicator field, the short message indicator field indicating that the short message is present in the DCI.

4. The WTRU of claim 3, wherein the short message is indicated in the DCI via at least one bit of a short message field being set to a predefined value.

5. The WTRU of claim 3, wherein the short message indicator field further indicates that a paging message is present for the WTRU.

6. The WTRU of claim 1, wherein the PDCCH transmission is received in a cell associated with New Radio Unlicensed (NR-U) access.

7. The WTRU of claim 1, wherein an indication of associations between respective PDCCH monitoring occasions of the paging occasion and a respective synchronization signal bursts (SSBs) is indicated via system information.

8. The WTRU of claim 7, wherein the system information further indicates a number of transmitted SSBs and a paging search space associated with the plurality of PDCCH monitoring occasions.

9. A method implemented by a wireless transmit/receive unit (WTRU), the method comprising:

receiving a physical downlink control channel (PDCCH) transmission during at least one paging occasion for the WTRU, wherein the at least one paging occasion for the WTRU is determined based on an identifier associated with the WTRU, and the at least one paging occasion for the WTRU is associated with a plurality of PDCCH monitoring occasions; and determine downlink control information (DCI) from the PDCCH transmission, wherein the DCI comprises a short message, the short message indicating that the WTRU can stop monitoring for subsequent PDCCH transmissions in remaining PDCCH monitoring occasions corresponding to the at least one paging occasion for the WTRU.

10. The method of claim 9, wherein the DCI is associated with a cyclic redundancy check (CRC) scrambled with a paging radio network temporary identifier (P-RNTI).

11. The method of claim 10, wherein the DCI comprises a short message indicator field, the short message indicator field indicating that the short message is present in the DCI.

12. The method of claim 11, wherein the short message is indicated in the DCI via at least one bit of a short message field being set to a predefined value.

13. The method of claim 11, wherein the short message indicator field further indicates that a paging message is present for the WTRU.

14. The method of claim 9, wherein the PDCCH transmission is received in a cell associated with New Radio Unlicensed (NR-U) access.

15. The method of claim 9, wherein an indication of associations between respective PDCCH monitoring occasions of the paging occasion and a respective synchronization signal bursts (SSBs) is indicated via system information.

16. The method of claim 15, wherein the system information further indicates a number of transmitted SSBs and a paging search space associated with the plurality of PDCCH monitoring occasions.

17. A network device comprising a processor configured to:

broadcast system information, the system information indicating a paging search space associated with a plurality of PDCCH monitoring occasions; and transmit a physical downlink control channel (PDCCH) transmission, the PDCCH transmission being sent during at least one paging occasion for a wireless transmit/receive unit (WTRU), wherein the at least one paging occasion for the WTRU is associated with an identifier of the WTRU, the at least one paging occasion for the WTRU is associated with the plurality of PDCCH monitoring occasions, the PDCCH transmission comprises downlink control information (DCI), and the DCI comprises a short message, the short message indicating that the WTRU can stop monitoring for subsequent PDCCH transmissions in remaining PDCCH monitoring occasions corresponding to the at least one paging occasion for the WTRU.

18. The network device of claim 17, wherein the DCI is associated with a cyclic redundancy check (CRC) scrambled with a paging radio network temporary identifier (P-RNTI), and the DCI comprises a short message indicator field, the short message indicator field indicating that the short message is present in the DCI.

19. The network device of claim 18, wherein the short message is indicated in the DCI via at least one bit of a short message field being set to a predefined value.

20. The network device of claim 17, wherein the PDCCH transmission is transmitted in a cell associated with New Radio Unlicensed (NR-U) access.

* * * * *